(12) United States Patent
Shiiyama et al.

(10) Patent No.: US 10,242,287 B2
(45) Date of Patent: Mar. 26, 2019

(54) IMAGE PROCESSING APPARATUS, IMAGE PROCESSING METHOD, AND RECORDING MEDIUM

(71) Applicant: CANON KABUSHIKI KAISHA, Tokyo (JP)

(72) Inventors: Hirotaka Shiiyama, Yokohama (JP); Masahiro Matsushita, Yokohama (JP); Hideki Sorakado, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/177,032

(22) Filed: Jun. 8, 2016

(65) Prior Publication Data

US 2016/0364883 A1 Dec. 15, 2016

(30) Foreign Application Priority Data

Jun. 11, 2015 (JP) .................................. 2015-118355
Jun. 11, 2015 (JP) .................................. 2015-118356

(51) Int. Cl.
*G06K 9/46* (2006.01)
*G06K 9/62* (2006.01)
(Continued)

(52) U.S. Cl.
CPC ......... *G06K 9/4652* (2013.01); *G06K 9/4642* (2013.01); *G06K 9/4671* (2013.01);
(Continued)

(58) Field of Classification Search
CPC ...... G06Q 40/08; G06Q 10/10; G06Q 20/042; G06Q 20/3276; G06F 17/00; G06F 17/3028; G06K 2009/4657; G06K 9/00791; G06K 9/52; G06K 9/6201; G06K 9/00449; G06K 9/32; G06K 9/38; G06K 9/42; G06K 9/00771; G06K 9/00228; G06K 9/00295;
(Continued)

(56) References Cited

U.S. PATENT DOCUMENTS 5,018,008 A * 5/1991 Asada ...................... H04N 1/60
358/518
7,925,047 B2 * 4/2011 Xiao .................. G06K 9/00228
348/345
(Continued)

FOREIGN PATENT DOCUMENTS

JP 2009-49759 A 3/2009
JP 4715527 B2 7/2011
JP 2012-105090 A 5/2012

*Primary Examiner* — Aklilu K Woldemariam
(74) *Attorney, Agent, or Firm* — Canon USA, Inc., IP Division

(57) ABSTRACT

An image processing apparatus includes a detection unit configured to detect at least one identical object or at least one object of an identical type from images captured by a plurality of imaging apparatuses, a selection unit configured to select at least one object from among at least one detected object based on color information of each object, and a determination unit configured to determine color correction information related to a plurality of the imaging apparatuses based on color information of at least one selected object. The image processing apparatus enables restricting the degradation of the color matching accuracy.

20 Claims, 15 Drawing Sheets

(51) Int. Cl.
*G06T 7/90* (2017.01)
*H04N 5/247* (2006.01)
*H04N 5/262* (2006.01)
*H04N 9/73* (2006.01)
*G06K 9/00* (2006.01)

(52) U.S. Cl.
CPC .............. *G06K 9/6212* (2013.01); *G06T 7/90* (2017.01); *H04N 5/247* (2013.01); *H04N 5/262* (2013.01); *H04N 9/735* (2013.01); *G06K 9/00234* (2013.01); *G06T 2207/10024* (2013.01); *G06T 2207/20072* (2013.01); *G06T 2207/30201* (2013.01)

(58) Field of Classification Search
CPC ....... G06K 9/00302; G06K 2009/3291; G06K 9/00885; G06K 9/209; G06K 9/00234; G06K 9/4642; G06K 9/4671; G06K 9/6212; G06T 11/206; G06T 2207/10004; G06T 7/0002; G06T 2207/30201; G06T 2207/10024; G06T 1/00307; G06T 2207/20072; G06T 7/90; H04N 7/18; H04N 21/472; H04N 21/47205; H04N 19/40; H04N 2207/20012; H04N 1/00822; H04N 2101/00; H04N 1/628; H04N 5/232; H04N 5/23219; H04N 9/735; H04N 9/045; G09G 2310/0262; G09G 2360/145; G09G 3/3233; B41J 19/145; B41J 2202/20; G03B 7/00
USPC ........ 382/103, 164, 167, 274; 348/207, 371, 348/571
See application file for complete search history.

(56) References Cited

U.S. PATENT DOCUMENTS

| | | | | |
|---|---|---|---|---|
| 2002/0003578 A1* | 1/2002 | Koshiba | ............... | G06T 1/60 348/273 |
| 2002/0044691 A1* | 4/2002 | Matsugu | ............... | G06K 9/20 382/218 |
| 2003/0007687 A1* | 1/2003 | Nesterov | ............... | G06K 9/0061 382/167 |
| 2003/0133154 A1* | 7/2003 | Ohyama | ............... | H04N 1/32502 358/1.15 |
| 2003/0174216 A1* | 9/2003 | Iguchi | ............... | H04N 1/4074 348/223.1 |
| 2004/0151396 A1* | 8/2004 | Nomura | ............... | G06T 7/11 382/254 |
| 2004/0208114 A1* | 10/2004 | Lao | ............... | H04N 5/23219 369/125 |
| 2005/0036160 A1* | 2/2005 | Goto | ............... | G06T 5/40 358/1.9 |
| 2005/0058341 A1* | 3/2005 | Maruoka | ............... | G06K 9/325 382/167 |
| 2005/0136549 A1* | 6/2005 | Gholap | ............... | G06K 9/0014 436/501 |
| 2006/0251338 A1* | 11/2006 | Gokturk | ............... | G06F 17/30253 382/305 |
| 2007/0070214 A1* | 3/2007 | Nakamura | ............... | G06K 9/00221 348/222.1 |
| 2007/0177050 A1* | 8/2007 | Xiao | ............... | G03B 7/091 348/371 |
| 2007/0195171 A1* | 8/2007 | Xiao | ............... | G06K 9/00228 348/207.99 |
| 2007/0201750 A1* | 8/2007 | Ito | ............... | G06K 9/00275 382/228 |
| 2009/0060326 A1* | 3/2009 | Imai | ............... | H04N 1/62 382/167 |
| 2010/0185064 A1* | 7/2010 | Bandic | ............... | A61B 5/0059 600/306 |
| 2011/0301441 A1* | 12/2011 | Bandic | ............... | A61B 5/0059 600/306 |
| 2012/0206653 A1* | 8/2012 | Graves | ............... | G11B 27/031 348/571 |
| 2013/0083969 A1* | 4/2013 | Tsukada | ............... | H04N 1/62 382/103 |
| 2013/0259364 A1* | 10/2013 | Shindo | ............... | G06K 9/4652 382/164 |
| 2013/0266181 A1* | 10/2013 | Brewer | ............... | G06K 9/00302 382/103 |
| 2016/0364883 A1* | 12/2016 | Shiiyama | ............... | G06K 9/6212 |

* cited by examiner

FIG.3

| | IMAGE FEATURE AMOUNTS | ATTRIBUTES |
|---|---|---|
| EXTRACTED FROM LUMINANCE IMAGE (LOW COLOR DEPENDENCE) | SIFT FEATURE AMOUNTS OF FACE ORGANIC POINTS | AGE<br>GENDER<br>GLASSES/NO GLASSES<br>MUSTACHE/NO MUSTACHE<br>BEARD/NO BEARD |
| EXTRACTED FROM COLOR IMAGE | SKIN COLOR<br>CLOTH COLOR<br>HAIR COLOR | RACE |

FIG.7A

|  |  | CAMERA | | | | | | | |
|---|---|---|---|---|---|---|---|---|---|
|  |  | A | B | C | D | E | F | G | H |
| QUERY | Q1 | ○ | ○ | ○ | ○ |  | ○ | ○ |  |
|  | Q2 | ○ | ○ | ○ | ○ | ○ | ○ | ○ | ○ |
|  | Q3 | N/A | N/A | N/A | N/A | N/A | N/A | N/A | N/A |

FIG.7B

|  |  | CAMERA | | | | | | | |
|---|---|---|---|---|---|---|---|---|---|
|  |  | A | B | C | D | E | F | G | H |
| QUERY | Q1 |  | ○ | ○ | ○ | ○ | ○ | ○ | ○ |
|  | Q2 |  | ○ | ○ |  | ○ | ○ |  |  |
|  | Q3 | ○ | ○ |  |  | ○ | ○ | ○ | ○ |

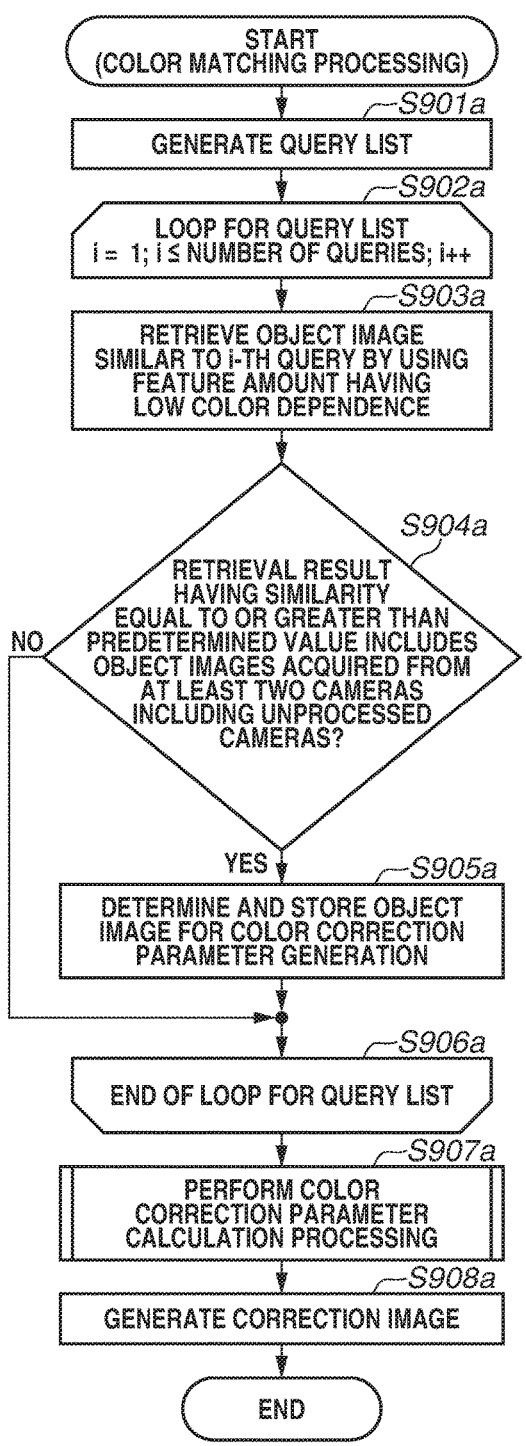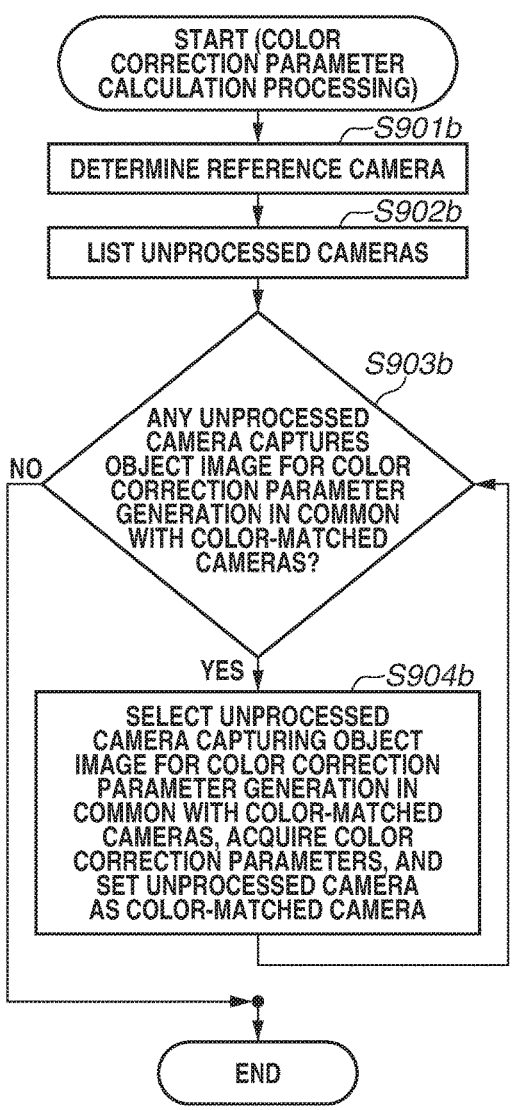

FIG.10A
| | | CAMERA | | | | | | | |
|---|---|---|---|---|---|---|---|---|---|
| | | A | B | C | D | E | F | G | H |
| QUERY | Q1 | ○ | ○ | ○ | ○ | | | | |
| | Q2 | | ○ | | | ○ | | | |
| | Q3 | | | | | ○ | ○ | ○ | ○ |
FIG.10B
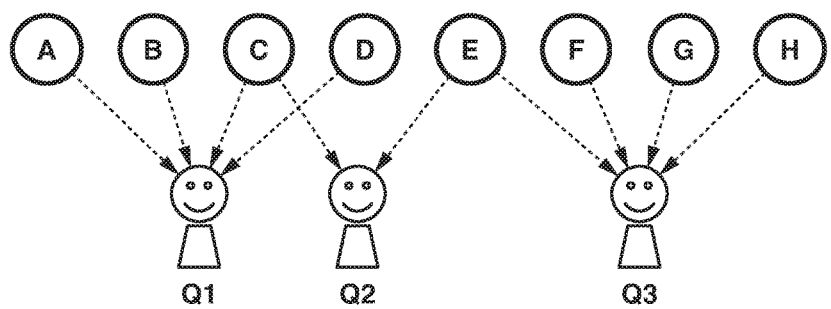
FIG.10C
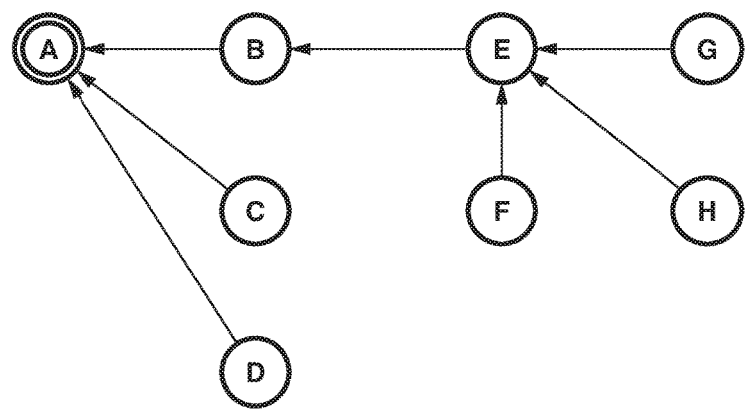

FIG.13C
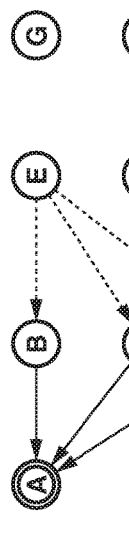
FIG.13D
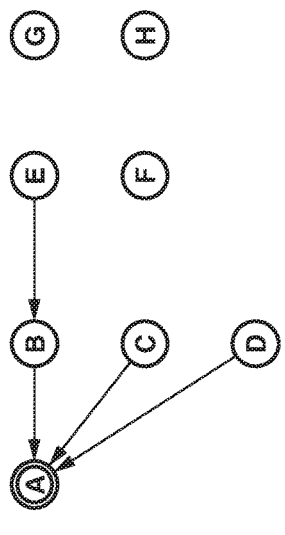
FIG.13E
FIG.13A
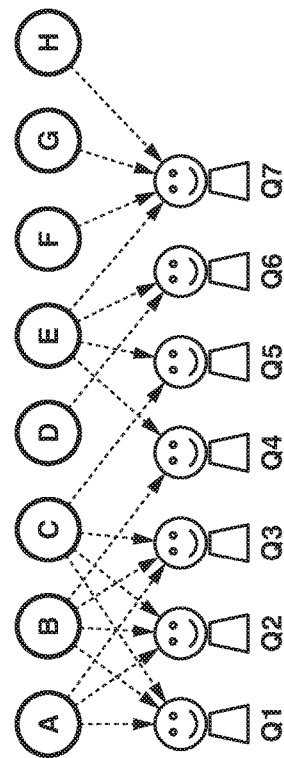
FIG.13B

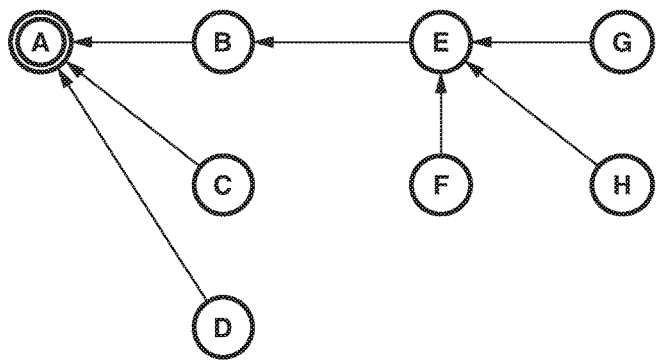
FIG.15A
FIG.15B
|   | A | B | C | D | E | F | G | H |
|---|---|---|---|---|---|---|---|---|
| A | 0 | 1 | 1 | 1 | 2 | 3 | 3 | 3 |
| B | 1 | 0 | 2 | 2 | 1 | 2 | 2 | 2 |
| C | 1 | 2 | 0 | 2 | 3 | 4 | 4 | 4 |
| D | 1 | 2 | 2 | 0 | 3 | 4 | 4 | 4 |
| E | 2 | 1 | 3 | 3 | 0 | 1 | 1 | 1 |
| F | 3 | 2 | 4 | 4 | 1 | 0 | 2 | 2 |
| G | 3 | 2 | 4 | 4 | 1 | 2 | 0 | 2 |
| H | 3 | 2 | 4 | 4 | 1 | 2 | 2 | 0 |
FIG.15C
|       | A  | B  | C  | D  | E  | F  | G  | H  |
|-------|----|----|----|----|----|----|----|----|
| TOTAL | 14 | 12 | 20 | 20 | 12 | 18 | 18 | 18 |
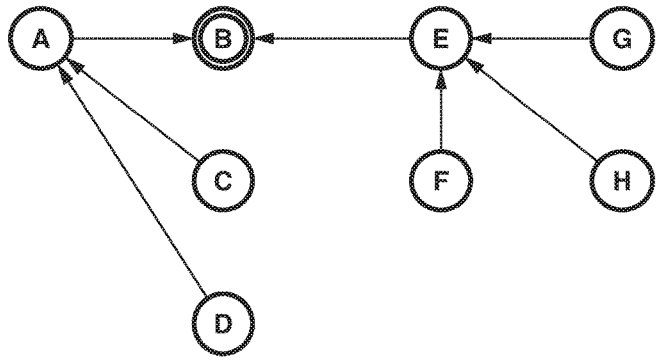
FIG.15D

IMAGE PROCESSING APPARATUS, IMAGE PROCESSING METHOD, AND RECORDING MEDIUM

BACKGROUND OF THE INVENTION

Field of the Invention

The present disclosure relates to a technique for matching colors between a plurality of images captured by a plurality of imaging apparatuses.

Description of the Related Art

There is known a conventional system that retrieves image feature amounts of an object (for example, a person) in images captured by a plurality of cameras (imaging apparatuses) (e.g., Japanese Patent Application Laid-Open No. 2012-105090). When retrieving image feature amounts of an object from images captured by a plurality of imaging apparatuses, the color of the identical object may be mismatched between the images because of the ambient light and illumination. Such color mismatching has reduced the object retrieval accuracy in retrieval based on color information.

Japanese Patent Application Laid-Open No. 2012-105090 discusses a technique for generating a corrected image having undergone white balance correction by using images of a white-based road sign captured by a plurality of imaging apparatuses attached to a vehicle, or a technique for generating a corrected image having undergone color matching by using images of a road element having color components, such as a curbstone constructed on the road surface.

The technique discussed in Japanese Patent Application Laid-Open No. 2012-105090 extracts an object of a predetermined specific type, such as images of a white-based road sign and images of a curbstone from all of images captured by a plurality of imaging apparatuses. However, there has been a problem that color matching cannot be correctly performed because of the difficulty in extracting an object suitable for performing color matching from images captured in various environments.

SUMMARY OF THE INVENTION

The present disclosure is directed to an image processing apparatus capable of selecting an object suitable for performing color matching, and restricting the degradation of the color matching accuracy of object images captured by a plurality of imaging apparatuses. The present disclosure is also directed to offering an image processing method and a storage medium.

According to an aspect of the present disclosure, an image processing apparatus includes, a detection unit configured to detect at least one identical object or at least one object of an identical type from images captured by a plurality of imaging apparatuses, a selection unit configured to select at least one object from among at least one detected object based on color information of each object, and a determination unit configured to determine color correction information related to a plurality of the imaging apparatuses based on color information of the at least one selected object.

Further features of the present disclosure will become apparent from the following description of exemplary embodiments with reference to the attached drawings.

BRIEF DESCRIPTION OF THE DRAWINGS

FIG. 3 illustrates examples of image feature amounts used in the image processing apparatus according to the first exemplary embodiment.

FIG. 7A illustrates an example of a table for storing information about imaging apparatuses satisfying a predetermined condition according to the first exemplary embodiment, and FIG. 7B illustrates another example of a table for storing information about imaging apparatuses satisfying a predetermined condition according to the first exemplary embodiment.

FIG. 9A is a flowchart illustrating a color matching processing flow according to the second exemplary embodiment, and FIG. 9B is a flowchart illustrating a color correction parameter calculation processing flow according the second exemplary embodiment.

FIG. 10A illustrate an example of a table of objects for generating color correction parameters according to the second exemplary embodiment, FIG. 10B illustrates an example of a relation between each query and a plurality of cameras for capturing an image of the query according to the second exemplary embodiment, and FIG. 10C illustrates a state where each camera performs color matching with a reference camera according to the second exemplary embodiment.

FIG. 13A illustrates an example of a table of objects for generating color correction parameters according to the third exemplary embodiment, FIG. 13B illustrates an example of a relation between each query and a plurality of cameras for capturing an image of the query according to the third exemplary embodiment, and FIGS. 13C, 13D, and 13E illustrate states where each camera performs color matching with a reference camera according to the third the exemplary embodiment.

FIG. 15A illustrates a state where each camera performs color matching with a reference camera according to the fourth exemplary embodiment, FIG. 15B illustrates a color matching counting matrix according to the fourth exemplary embodiment, FIG. 15C illustrates another example of a state where each camera performs color matching with a reference camera according to the fourth exemplary embodiment, and FIG. 15D illustrates an example of a color matching state according to the fourth exemplary embodiment.

DESCRIPTION OF THE EMBODIMENTS

A configuration of a computer apparatus constituting an image processing apparatus according to a first exemplary embodiment will be described below with reference to a block diagram illustrated in FIG. 1. An image processing apparatus 100 may be implemented by a single computer apparatus or by a plurality of computer apparatuses each including one or more processors and one or more memories, and having a distributed function as desired. When the image processing apparatus 100 includes a plurality of computer apparatuses, these computers are communicably connected with each other via a local area network (LAN). A computer apparatus is implemented by an information processing apparatus such as a personal computer (PC) and a workstation (WS).

Figure 1:
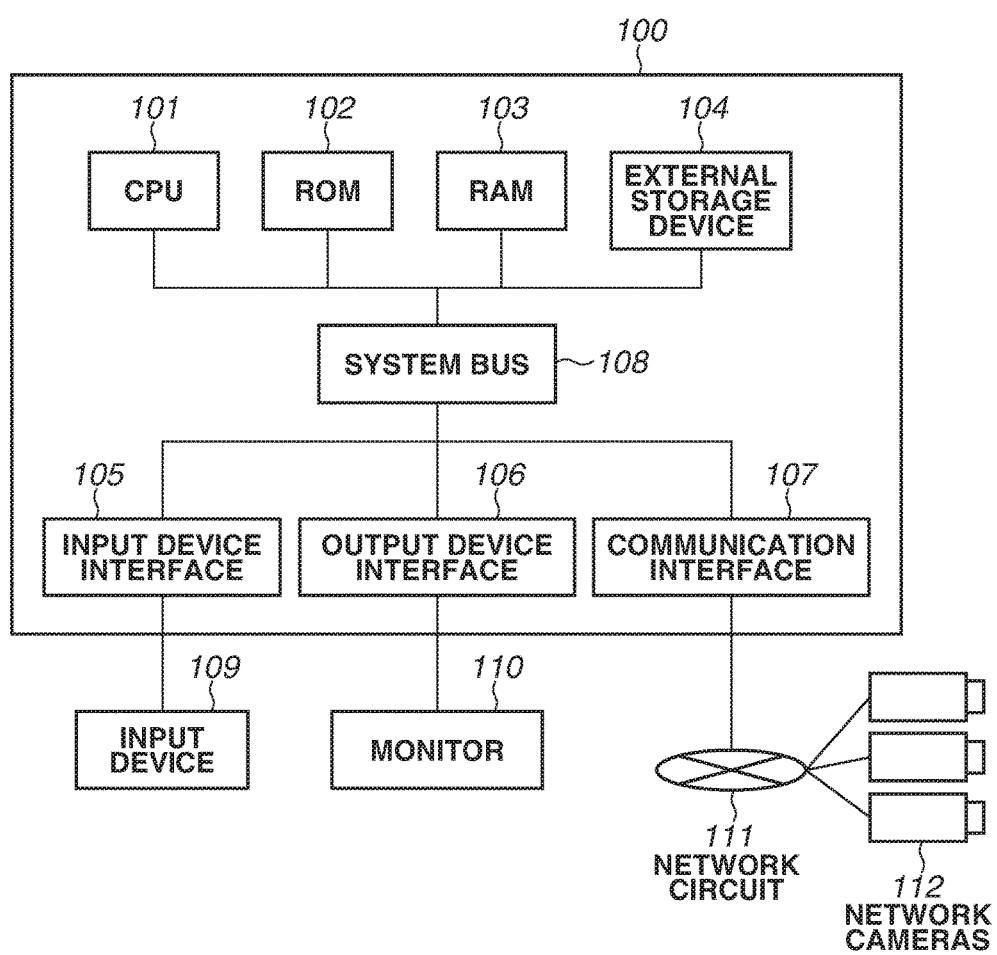
FIG. 1 is a block diagram illustrating an example of a hardware configuration of an image processing apparatus according to a first exemplary embodiment.

Referring to FIG. 1, a central processing unit (CPU) 101, which may include one or more processors and one or more memories, controls an entire computer apparatus 100. A read only memory (ROM) 102 stores programs and parameters that do not need to be changed. A random access memory (RAM) temporarily stores a program and data supplied from an external apparatus. An external storage device 104 is, for example, a hard disk or a memory card stationarily installed in the computer apparatus 100. The external storage device 104 may include a flexible disk (FD), an optical disk such as a compact disk (CD), a magnetic card, an optical card, an integrated circuit (IC) card, a memory card, etc., which are attachable to and detachable from the computer apparatus 100. An input device interface 105 is an interface with an input device 109 such as a pointing device and a keyboard for receiving a user operation to input data. An output device interface 106 is an interface with a monitor 110 for displaying data held by the computer apparatus 100 and supplied data. A communication interface 107 is connected with a network circuit 111 such as the Internet, and inputs and outputs data from/to the outside. Network cameras 112 are imaging apparatuses such as a plurality of monitoring cameras, and are connected with the computer apparatus 100 via the network circuit 111. A system bus 108 is a transmission path for communicably connecting each unit.

Each operation (described below) is implemented when the CPU 101 executes a program stored in a computer-readable storage medium such as the ROM 102.

[Image Processing Apparatus]

The image processing apparatus 100 according to the present exemplary embodiment clips object image regions from image data acquired from imaging apparatuses such as a plurality of cameras, accumulates them as object images, and performs processing using the accumulated object images. When collating images by using the image processing apparatus 100 according to the present exemplary embodiment, the image processing apparatus 100 generates a correction image by matching the colors of images captured by the respective imaging apparatuses with the colors of an image captured by a reference imaging apparatus (reference camera) before performing image collation.

More specifically, the image processing apparatus 100 identifies an object (target object) image suitable for color matching from among object images captured by a plurality of imaging apparatuses. Then, by using the target object image, the image processing apparatus 100 estimates color correction parameters for matching the colors of images captured by the respective imaging apparatuses with the colors of an image captured by the reference imaging apparatus (also referred to as a reference camera). Before performing collation, the image processing apparatus 100 generates a correction image by using images captured by the respective imaging apparatuses and color correction parameters.

In identifying an object (target object) image suitable for color matching, it is necessary to satisfy a condition that the similarity between object images is equal to or greater than a predetermined value. Therefore, actually, even when an identical object is captured by a plurality of imaging apparatuses, the object may not be used for color matching if object images do not satisfy a predetermined condition. Selecting a target object to be used for color matching in this way enables reducing the probability that erroneous color matching occurs.

Although, in the present exemplary embodiment, a person is assumed as an object, an object is not limit thereto, and may be anything as long as it is suitable for color matching.

Figure 2:
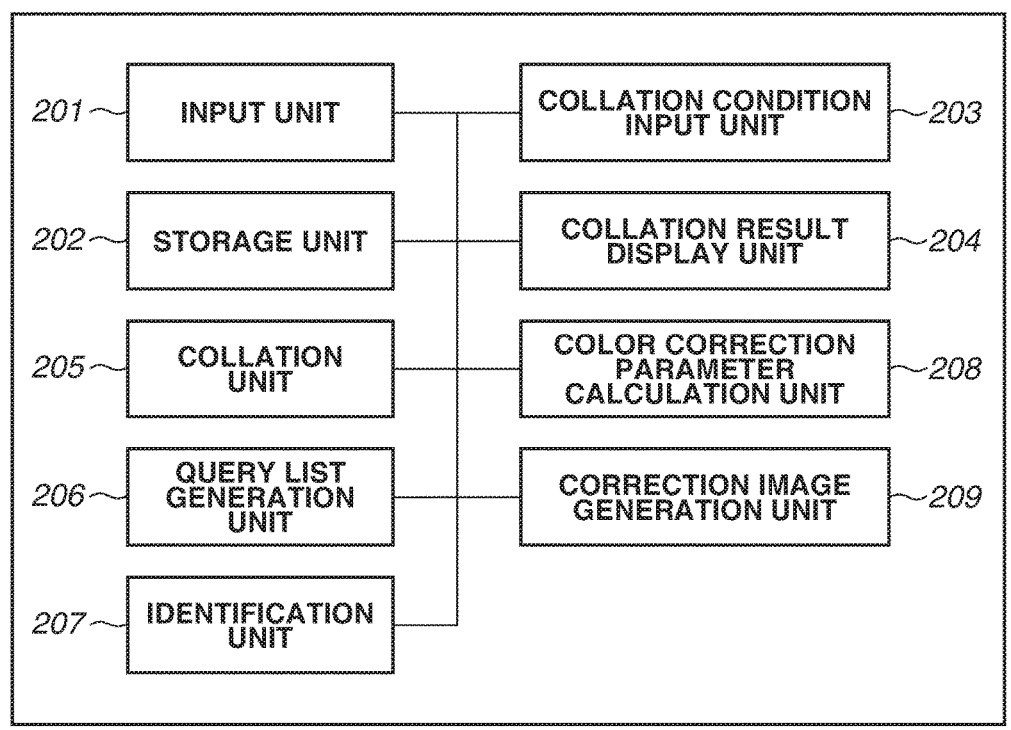
FIG. 2 is a block diagram illustrating an example of a functional configuration of the image processing apparatus according to the first exemplary embodiment.

A functional configuration of the image processing apparatus 100 according to the present exemplary embodiment will be described below with reference to FIG. 2.

An input unit 201 receives an input of an object image. More specifically, the input unit 201 inputs an object image clipped from a captured image acquired from each of the network cameras 112. Alternatively, the input unit 201 inputs frame numbers in which an object appears and coordinates information of an object image region in images acquired from each of the network cameras 112.

When the input unit 201 receives an input of a captured image, a clipping unit (not illustrated) of the image processing apparatus 100 may clip an object image from the captured image. Alternatively, each of the network cameras 112 may clip an object image in advance, and transmit only the object image to the image processing apparatus 100.

A storage unit 202 stores an object image input from the input unit 201. More specifically, the storage unit 202 stores object image data in the external storage device 104. In addition, as metadata of an object, the storage unit 202 pre-stores an object identifier (ID), an image capturing time, and a camera that captured the object image in an associated way. Instead of object image data, the storage unit 202 may prestore video data acquired from the network cameras 112, and store frame numbers in which the object image appears and coordinates information of the object image region.

A collation condition input unit 203 specifies object images to be used for collation. More specifically, the collation condition input unit 203 displays object images stored in the storage unit 202 on the monitor 110, and specifies object images to be collated via the input device 109. Alternatively, the collation condition input unit 203 may display a screen for specifying an image capturing time and the attribute value of image features on the monitor 110, extract object images stored in the storage unit 202 under a condition specified via the input device 109, and display a result on the monitor 110. Alternatively, the collation condition input unit 203 may specify image data stored in the external storage device 104 as a comparison source image, and specify object image data stored in the storage unit 202 as a comparison target image. However, a method for specifying object images to be used for collation according to the present exemplary embodiment is not limited thereto.

In specifying object images to be collated, the collation condition input unit 203 may specify two object images (one comparison source object image and one comparison target object image) as object images to be used for collation. Alternatively, the collation condition input unit 203 may select a plurality of comparison target images for each comparison source image. Alternatively, the collation condition input unit 203 may allow only one comparison source image to be selected, and automatically select all of object images stored in the storage unit 202 as comparison target images. However, a method for specifying object images to be used for collation according to the present exemplary embodiment is not limited thereto.

A collation result display unit 204 displays a result of collation between object images specified by the collation condition input unit 203. Collation processing (described in detail below) determines the similarity representing the degree of resemblance between the comparison source and the comparison target object images. The collation result display unit 204 displays a result of collation by using this similarity. For example, when one comparison target object image and one comparison source object image are collated, the collation result display unit 204 displays the similarity between these object images on the monitor 110. Alternatively, when one comparison source object image and a plurality of comparison target object images are collated, the collation result display unit 204 displays the comparison target object images on the monitor 110 in order of the similarity. Alternatively, the collation result display unit 204 may display comparison target object images having a similarity equal to or greater than a predetermined value, classified for each camera in order of the image capturing time. However, a method for displaying a result of collation according to the present exemplary embodiment is not limited thereto.

A collation unit 205 performs collation between a comparison source object image and a comparison target object image. More specifically, the collation unit 205 compares image feature amounts between the comparison source and the comparison target object images to collate the two images. In the present exemplary embodiment, the collation unit 205 uses image feature amounts of a person as illustrated in FIG. 3 assuming a person as an object. However, the image feature amounts illustrated in FIG. 3 are examples, and the present exemplary embodiment is not limited thereto.

The method for calculating these image feature amounts will be described below. The Scale Invariant Feature Transform (SIFT) feature amount is used as an image feature amount that does not largely change even when the color largely changes, i.e., an image feature amount having a low color dependence. Since the SIFT feature amount is acquired from a luminance image, it has a low color dependence. The SIFT feature amounts of face organ points illustrated in FIG. 3 can be obtained by detecting the face region of a person, retrieving organ points such as eyes and a mouth in the face region, and calculating the SIFT feature amounts corresponding to respective organ points. In collation processing using the SIFT feature amounts, the collation unit 205 calculates the sum of the similarities of the SIFT feature amounts corresponding to respective organ points in the face regions in the comparison source and the comparison target person images. Alternatively, the collation unit 205 may determine the similarity by using the number of organ points having a similarity equal to or greater than a predetermined value.

The collation unit 205 obtains the skin color or hair color by predetermining a corresponding partial area in the face region acquired in face detection and obtaining a color histogram of the partial area.

The collation unit 205 also obtains the cloth color by predetermining that the area below the face region acquired in face detection is the body region corresponding to the body and obtaining a color histogram of the body region.

The collation unit 205 generates a classifier capable of estimating various attributes when a face region image is detected, based on a machine learning technique, and obtains various attributes (age, gender, etc.) of a person by using the classifier. When the likelihood of an attribute can be acquired, the collation unit 205 generates an attribute vector having likelihood for each attribute value, and obtains the similarity of each attribute based on the similarity between the attribute vectors.

Since the SIFT feature amounts, and similarities such as color histograms and attribute vectors are separately obtained, the collation unit 205 obtains the similarity between the comparison source and the comparison target object images by suitably weighting these values and obtaining the sum of these weighted values.

When the collation unit 205 retrieves and identifies a target object image to be used for color matching between colors of images captured by a plurality of imaging apparatuses, it is desirable to use image feature amounts having a low color dependence. Therefore, the present exemplary embodiment uses image feature amounts and attributes of a person extracted from a luminance image illustrated in FIG. 3. This processing increases the probability that an identical object captured by a plurality of imaging apparatuses can be determined to be identical even with different colors of images of the identical object captured by a plurality of imaging apparatuses.

Meanwhile, after color matching, it is desirable to perform collation by using all of the image feature amounts. In the present exemplary embodiment, all of the feature amounts illustrated in FIG. 3 are used. Thus, using the color-dependent image feature amounts after performing color matching enables preventing the degradation of the object collation accuracy compared to a case where color matching is not performed.

The image feature amounts used by the collation unit 205 may be pre-calculated for each object and pre-stored in the storage unit 202. For example, the image feature amounts before color matching are calculated and stored when object images are input to the input unit 201. Meanwhile, the image feature amounts after color matching are stored in the storage unit 202 when the image feature amounts after color matching are calculated.

A query list generation unit 206 generates a query list for identifying a target object image to be used for color matching. More specifically, the query list generation unit 206 selects some object images from among object images stored in the storage unit 202 as queries, and generates a query list of query candidates with assigned priorities. Since a query also describes a comparison source object image, the query list also describes a list of comparison source object image candidates.

The overview of processing of the query list generation unit 206 will be described below.

The query list generation unit 206 selects a comparison source object image according to the following condition.

The condition is that the color of the comparison source object image is suitable for calculation of correction parameters. When the color of the comparison source object image is monochrome or achromatic, color correction parameters based on the color of the target object image cannot be calculated. Therefore, to make it easier for the query list generation unit 206 to calculate color correction parameters, it is necessary to preferentially identify an object from which color information other than achromatic colors (for example, black and gray as the cloth color) can be acquired.

In the present exemplary embodiment, an object image suitable for color matching can be selected by selecting an object satisfying such a condition.

In the present exemplary embodiment, in selecting an object image, the query list generation unit 206 takes into consideration a condition that "the comparison source object image is unique and is not easily selected by mistake for other object images" in addition to the above-described condition. When attributes are pre-extracted by an extraction unit (not illustrated), statistical values of the frequencies of attributes having a low color dependence (gender, age, glasses/no glasses, etc.) are pre-acquired. Then, the query list generation unit 206 preferentially identifies an object having attributes with frequencies equal to or smaller than respective predetermined frequencies. This processing makes it easier to distinguish the comparison source object image from other object images, thus reducing the probability of erroneous retrieval.

In consideration of these two conditions, the query list generation unit 206 generates a list of comparison source object image candidates with assigned priorities.

A target object identification unit 207 identifies a target object image to be used for color matching between the imaging apparatuses. More specifically, by using as a query an object image selected from the list of comparison source object image candidates generated by the query list generation unit 206, the target object identification unit 207 identifies from the storage unit 202 object images captured by the respective imaging apparatuses that can be determined to be identical to the query. Then, the target object identification unit 207 identifies one object (target object) image to be used for color matching for each imaging apparatus. For example, when the similarities with the query are equal to or greater than respective predetermined values, the target object identification unit 207 determines that the object image is a target object image to be used for color matching, and selects it as a target object image candidate.

The target object identification unit 207 further selects a case where there is the largest number of imaging apparatuses that captured an identical target object, and identifies a final target object image.

When images of the identical target object captured by all of the imaging apparatuses are acquired, it is possible to calculate color correction parameters of images captured by all of the imaging apparatuses.

Even when images of the identical target object captured by all of the imaging apparatuses cannot be acquired, identifying images of the identical object captured by the largest number of imaging apparatuses that captured the identical object enables maximizing the number of imaging apparatuses that can be color-matched. Alternatively, when the ratio of the number of imaging apparatuses that captured the identical target object to the total number of imaging apparatuses is equal to or greater than a predetermined value, the target object identification unit 207 identifies the identical target object image.

In the case of a plurality of imaging apparatuses unable to capture images of an identical object at the same time or in the same time zone, if the target object identification unit 207 identifies target object candidates captured by these imaging apparatuses at the same time or in the same time zone, at least one of these candidates may possibly be erroneous. In this case, it is possible not to use the identified target object images for color matching.

A color correction parameter calculation unit 208 calculates color correction parameters as information used for color matching. More specifically, by using two object images, the color correction parameter calculation unit 208 obtains color correction parameters so that the colors of the two object images are matched. In the case of a person, for example, the color correction parameter calculation unit 208 uses a skin region in the face region or uses a cloth region to obtain color correction parameters. However, a target object region to be used to calculate color correction parameters is not limited thereto.

A correction image generation unit 209 generates a correction image in which colors are corrected by using the color correction parameters.

A method for calculating color correction parameters and a method for generating a correction image by using the color correction parameters will be described below. For example, as discussed in Japanese Patent Application Laid-Open No. 2009-49759, it is also possible to obtain a plurality of corresponding points in an object, and configure a look-up table based on color differences between the corresponding points for use as color correction parameters. A correction image is generated by replacing the color of each pixel of input image data with a different color, referring to the look-up table.

Alternatively, as discussed in Japanese Patent No. 4715527, it is also possible to obtain a color correction matrix for use as color correction parameters. A correction image is generated by multiplying each pixel of input image data by the color correction matrix to replace the color of each pixel with a different color. In the present exemplary embodiment, referring to the distribution of an obtained color correction matrix group, the color correction parameter calculation unit 208 may obtain an average matrix excluding data different from reference data by a predetermined value or above, or obtain an average matrix by selecting only data not different therefrom by a predetermined value or above.

However, a method for calculating color correction parameters according to the present exemplary embodiment is not limited thereto. In calculating color correction parameters, there may be differences in the color system.

[Color Matching Processing Flow]

Figure 4:
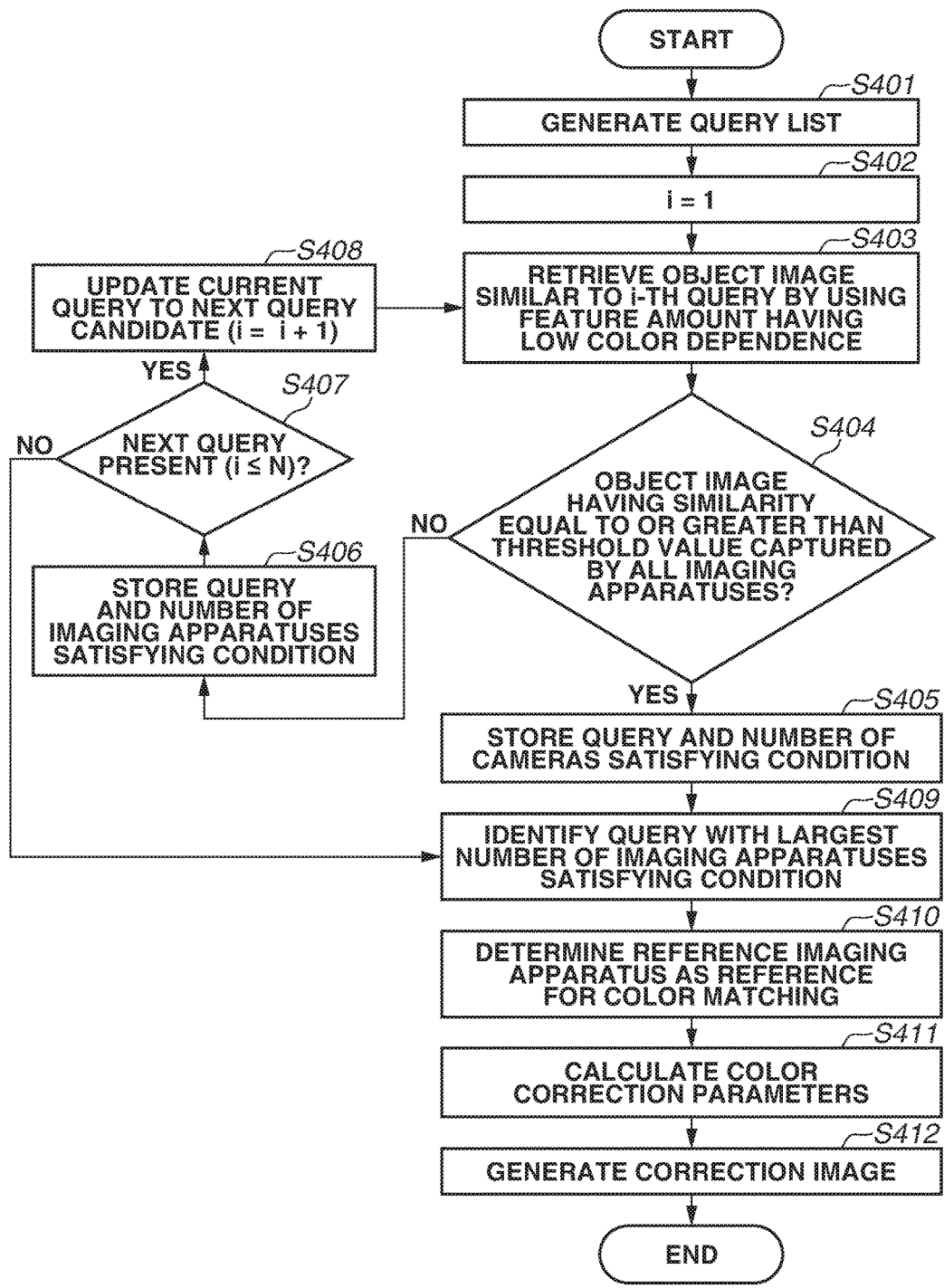
FIG. 4 is a flowchart illustrating a color matching processing flow according to the first exemplary embodiment.

A color matching processing flow according to the present exemplary embodiment will be described below with reference to a flowchart illustrated in FIG. 4. The flowchart is implemented when the CPU 101 executes a control program. In this processing, the CPU 101 first identifies a target object image captured by a plurality of imaging apparatuses in common. Then, the CPU 101 calculates color correction parameters of object images captured by the respective imaging apparatuses. Then, the CPU 101 generates correction images for the object images captured by the respective imaging apparatuses, and calculates image feature amounts of the correction images for the object images.

In performing the color matching processing, image feature amounts prior to color matching are assumed to have been pre-calculated based on the object images stored in the storage unit 202. In addition, this processing is given a list of cameras subjected to the color matching processing.

The processing will be described in detail below with reference to a flowchart illustrated in FIG. 4.

In step S401, the CPU 101 generates a query list (comparison source object candidate list). More specifically, the query list generation unit 206 selects some of the object images stored in the storage unit 202 to generate a query list.

Figure 5:
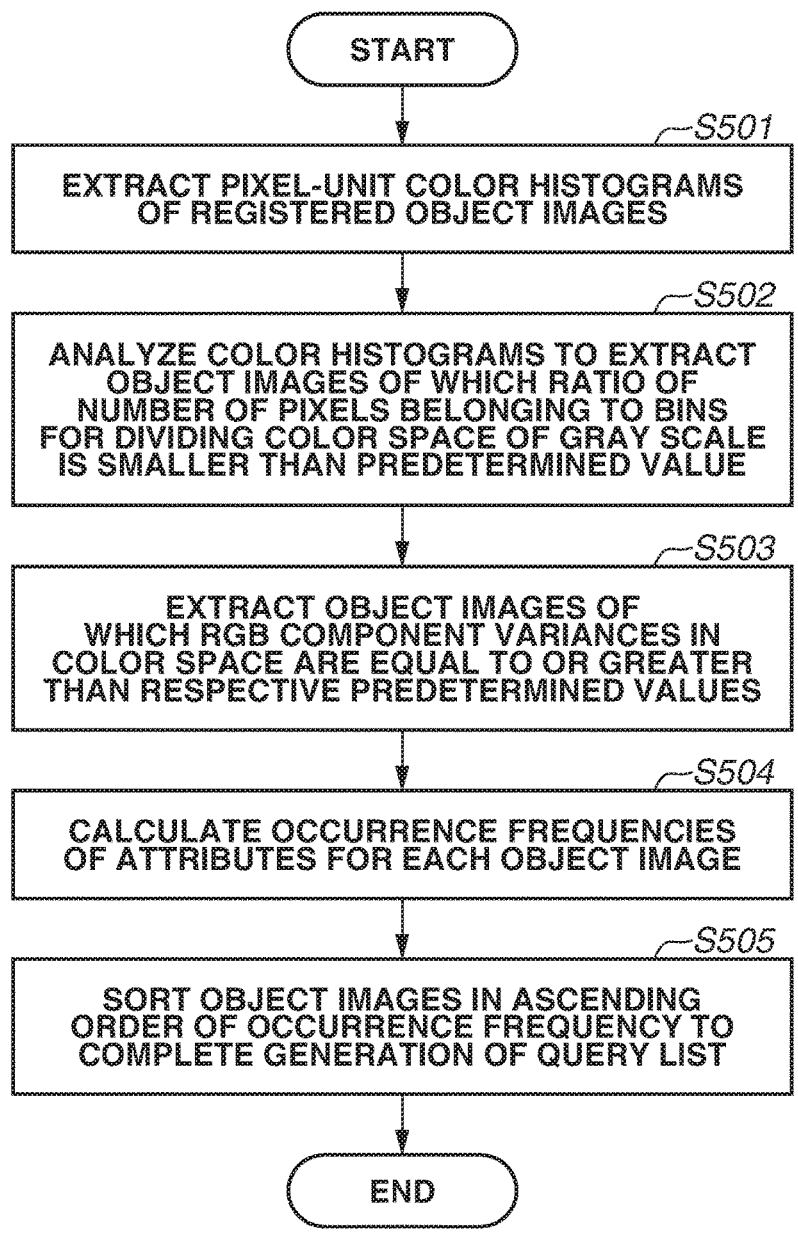
FIG. 5 is a flowchart illustrating a query list generation processing flow according to the first exemplary embodiment.

Processing of the query list generation unit 206 will be described in detail below with reference to FIG. 5. As described above, in the present exemplary embodiment, the query list generation unit 206 selects an object image suitable for color matching by selecting an object image of which the color of the comparison source object image is suitable for color correction parameter calculation. When the color of the comparison source object image is monochrome or achromatic, color correction parameters based on the color of the target object image cannot be calculated. Therefore, to make it easier to calculate color correction parameters, the query list generation unit 206 needs to preferentially identify an object from which color information other than achromatic colors (for example, black and gray as the cloth color) can be acquired.

In the present exemplary embodiment, the query list generation unit 206 selects an object image taking into consideration a condition that "the comparison source object image is unique and is not easily selected by mistake for other object images" in addition to the above-described condition. Therefore, when attributes are pre-extracted, statistical values of the frequencies of attributes having a low color dependence (e.g., gender, age, glasses/no glasses) are pre-acquired. Then, the query list generation unit 206 preferentially identifies an object having attributes equal to or smaller than respective predetermined frequencies. This processing makes it easier to distinguish the comparison source object image data from other object image data, thus reducing the probability of erroneous retrieval.

Processing in steps S501, S502, and S503 is processing for selecting an object from which colors suitable for color matching can be acquired. Processing in steps S504 and S505 is processing for selecting a unique object.

In step S501, the query list generation unit 206 extracts pixel-unit color histograms of the object images stored in the storage unit 202.

Figure 6:
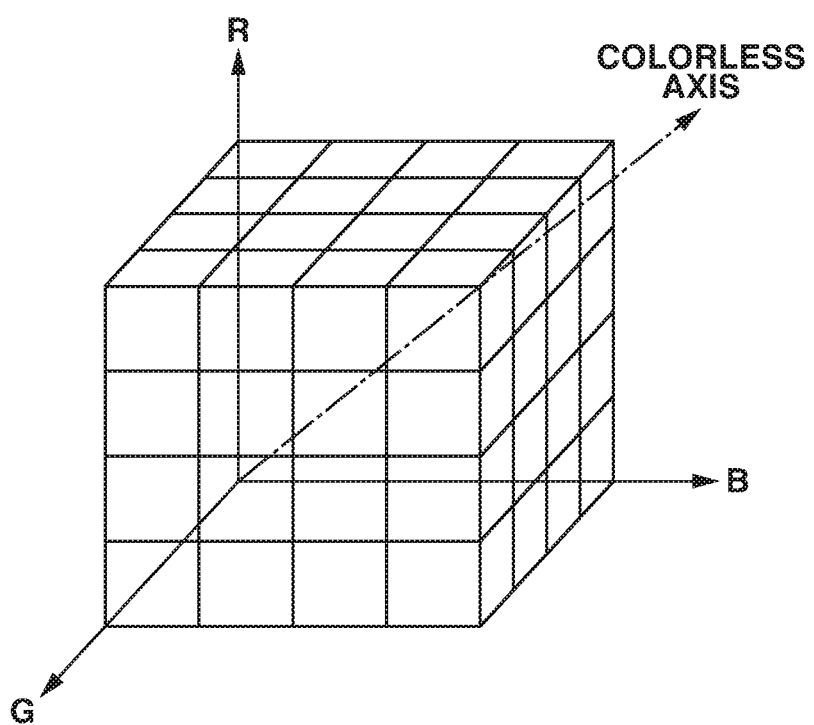
FIG. 6 illustrates an example of a red, green, and blue (RGB) color space used in the query list generation processing according to the first exemplary embodiment.

FIG. 6 illustrates an example of the RGB color space divided into a plurality of bins. The present exemplary embodiment will be described below based on an example where the color space is simply divided into 64 (4×4×4) bins. The diagonal line (dotted line) passing through the origin of the color space represents the color of gray scale, i.e., an achromatic axis. When there are many pixels belonging to bins containing this achromatic axis (also referred to as bins for dividing color space of gray scale), it is difficult to obtain color correction parameters. In step S502, the query list generation unit 206 extracts object image data of which the ratio of the number of pixels belonging to bins for dividing color space of gray scale to the total number of pixels of the object image data is smaller than a predetermined value.

The query list generation unit 206 also converts the RGB value of pixels of the object image into a color space (such as YUV) represented by a luminance signal and color-difference signals, and calculates a pixel-unit accumulation value of the Y luminance component and pixel-unit accumulation values of the absolute values of the U and V color-difference components. The query list generation unit 206 obtains the absolute values of the U and V color-difference components because these components can be negative. The query list generation unit 206 may extract object images of which the ratio of the accumulation values of the color-difference components to the accumulation value of the luminance component is equal to or greater than a predetermined value.

Even with a pixel having a color (large absolute values of the U and V color-difference components), for example, it is difficult to obtain color correction parameters if the G and B components of the RGB value are zero. It is necessary that object image data has each of the R, G, and B components to a certain extent.

In step S503, the query list generation unit 206 converts the RGB value of pixels of the object image into the YUV space, and calculates a pixel average U_mean of the absolute value of the U color-difference signal and a pixel average V_mean of the absolute value of the V color-difference signal. The query list generation unit 206 is able to preferentially identify object image data having a favorable balance between the R, G, and B components according to whether the object image data has each of the R, G, and B components to a certain extent of which both of the above-described pixel averages are equal to or greater than respective threshold values.

In using bins of the RGB color space illustrated in FIG. 6, the query list generation unit 206 obtains pixel histograms of the stored object images. Then, the query list generation unit 206 is able to determine whether the object image data is to be used as a query by confirming that the data has no neutral colors as a mixture of the three (R, G, and B) colors and contains all of the R, G, and B pixels.

Naturally, the present disclosure is not limited to the above-described method as long as the processing estimates an object having each of the R, G, and B components to a certain extent.

Further, when the attributes having a low color dependence illustrated in FIG. 3 are pre-extracted by the extraction unit (not illustrated), the query list generation unit 206 obtains in advance the frequencies of attributes having a low dependence on each color extracted from all of the stored objects. For example, for the attribute "Glasses/No Glasses" extracted from each object image, the query list generation unit 206 obtains the occurrence frequency of the attribute "Glasses" and the occurrence frequency of the attribute "No Glasses" from all of the stored objects.

In step S504, the query list generation unit 206 estimates the frequencies of attribute combinations based on an occurrence frequency distribution. To simply perform the estimation, the query list generation unit 206 only needs to calculate the product of the frequencies of the respective attributes. For example, there is a strong correlation between gender, mustache, and beard. Therefore, when a person is determined to be a woman, the product of the frequencies of the attributes "Age" and "Glasses" may be used.

In step S505, the query list generation unit 206 sorts the extracted objects in ascending order of the frequencies to complete the generation of a query list.

This processing enables acquiring a query list including object images with which color correction parameters can be easily acquired and erroneous retrieval does not easily occur.

In step S402, the CPU 101 starts a loop for sequentially processing the queries in the query list including N object image candidates acquired in step S401. The queries are sequentially assigned a number from 1. To refer to the query list by using a variable i, the CPU 101 first initializes the variable i to 1. In step S407, the CPU 101 determines whether the variable i is equal to or smaller than the predetermined number of queries N. When the variable i is equal to or smaller than the number N (YES in step S407), the processing proceeds to step S408. On the other hand, when this condition is not satisfied (NO in step S407), the processing exits the loop and proceeds to step S409.

In step S403, the CPU 101 retrieves an object image similar to the i-th query from the storage unit 202 by using image feature amounts having a low color dependence. More specifically, the collation unit 205 assumes the i-th query as the comparison source object image and an object image stored in the storage unit 202 as the comparison target object image. Then, the collation unit 205 performs collation by using image feature amounts having a low color dependence. For example, the collation unit 205 performs collation by using the image feature amounts extracted from a luminance image illustrated in FIG. 3. Finally, the collation unit 205 associates the comparison target object images with the similarity to provide a retrieval result.

In step S404, focusing only on object images associated with a similarity equal to or greater than a predetermined value, the CPU 101 identifies imaging apparatuses such as cameras that captured respective objects. When the identified imaging apparatuses include all of the imaging apparatuses (YES in step S404), the processing proceeds to step S405. On the other hand, when this condition is not satisfied (NO in step S404), the processing proceeds to step S406.

In step S405, the CPU 101 stores the current query as a target object image, and information such as the number of imaging apparatuses satisfying a predetermined condition. Then, the CPU 101 stores the stored information in the table illustrated in FIG. 7A. The table illustrated in FIG. 7A is an example.

In the table illustrated in FIG. 7A, indicates "an imaging apparatus in which an object image similar to each query is found". For example, an object image similar to the first query Q1 is found in six imaging apparatuses A, B, C, D, F, and G. An object image similar to the second query Q2 is found in all of the eight imaging apparatuses A to H. Since the processing exits the loop in step S404, retrieval is not performed for the third query Q3. "N/A" indicates that an object image similar to the query Q3 is not found.

On the other hand, a case where an object image similar to the current query is not found in all of the imaging apparatuses in step S404 is a case where retrieval is performed for the first query Q1 in step S406. In this case, the CPU 101 stores the first query Q1 as a target object image and imaging apparatuses satisfying the condition.

In step S407, the CPU 101 determines whether the next query exists (i≤N). When the next query exists (YES in step S407), then in step S408, the CPU 101 updates the variable i with a formula i=i+1 to update the current query to the next query candidate. Then, the processing returns to step S403.

The processing proceeds to step S409 when an object image similar to the current query is found in all of the eight imaging apparatuses A to H in step S405.

FIG. 7A illustrates a case where an object image similar to the second query Q2 in the query list is found in all of the eight imaging apparatuses A to H.

FIG. 7B illustrates a case where an object image similar to the first query Q1 to the third query Q3 in the query list is not found in all of the imaging apparatuses, and then the processing proceeds to step S409.

In step S409, the CPU 101 determines to use the target object image (when the number of imaging apparatuses satisfying the condition is maximized) to estimate color correction parameters. In the case illustrated in FIG. 7A, an object image similar to the second query Q2 is used to estimate color correction parameters for the eight imaging apparatuses A to H. In the case illustrated in FIG. 7B, the object image similar to the first query Q1 is used to calculate color correction parameters for the seven imaging apparatuses B to H.

In the case of a plurality of imaging apparatuses unable to capture images of an identical object at the same time or in the same time zone, if the CPU 101 retrieves an object image similar to a certain query from among object images captured by these imaging apparatuses at the same time or in the same time zone, the retrieval is highly likely to be erroneous. The CPU 101 may perform, in step S404, processing for excluding the retrieved object image from the estimation of color correction parameters.

In step S410, the CPU 101 selects an image to be used as a reference for color correction parameter calculation.

As for selection of an image to be used as a reference for color correction parameter calculation, since an object image found in retrieval includes an identical image to a query without exception, this image can be used as a reference for color correction parameter calculation.

The CPU 101 may select an object image having the smallest object ID found in retrieval as a reference for color correction parameter calculation.

In step S411, by using the selected object image, the CPU 101 calculates color correction parameters for images captured by the respective imaging apparatuses. The CPU 101 obtains color correction parameters of images captured by imaging apparatuses other than the imaging apparatus that captured the object image to be used as a reference determined in step S410.

Although not illustrated in FIGS. 7A and 7B, the image ID of each object is stored. Since this image ID allows the storage unit 202 to refer to object image data, the stored images can be used.

In step S412, the CPU 101 reflects color correction parameters. More specifically, by using the color correction parameters, the correction image generation unit 209 generates a correction image by matching the colors of object images captured by the respective imaging apparatuses with the colors of the reference image.

The following methods can be used for the calculation of the color correction parameters in step S411, and for the generation of a correction image in step S412. For example, as discussed in Japanese Patent Application Laid-Open No. 2009-49759, it is also possible to obtain a plurality of corresponding points in an object, and configure a look-up table based on color differences between these corresponding points for use as color correction parameters. A correction image is generated by replacing the color of each pixel of input image data with a different color, referring to the look-up table.

Alternatively, as discussed in Japanese Patent No. 4715527, it is also possible to obtain a color correction matrix for use as color correction parameters. A correction image is generated by multiplying each pixel of input image data by the color correction matrix to replace the color of each pixel with a different color.

However, the method for calculating color correction parameters and the method for generating a correction image according to the present exemplary embodiment are not limited thereto.

The CPU 101 stores the generated correction image in the storage unit 202 to allow it to be used in object image collation by the collation unit 205. Alternatively, the CPU 101 pre-calculates attribute information to be used by the collation unit 205. For example, the CPU 101 may recalculate the image feature amounts dependent on the colors extracted from a color image illustrated in FIG. 3 and then store them in the storage unit 202.

In the example illustrated in FIG. 7A, correction images can be generated for the object images captured by all of the imaging apparatuses. In the example illustrated in FIG. 7B, however, only the object image captured by the imaging apparatus A will remain as an uncorrected image.

The above-described processing restricts the degradation of the object image collation accuracy due to differences between image colors of different imaging apparatuses that have captured an identical object. For example, images of an identical object captured by monitoring cameras installed in different environments may possibly provide different colors because of the influences of shadows, sunlight, and light source differences. The above-described processing will restrict the degradation of the collation accuracy due to these influences.

A correction image generated by using the color correction parameters may be used not only for collation but also for display. For example, in displaying a result on the collation result display unit 204, the generated correction image may be displayed. This processing eliminates color differences between display images of an identical object, allowing a viewer to comfortably view images.

According to the first exemplary embodiment, color matching between a plurality of imaging apparatuses is performed by using an identical object captured by all of a plurality of imaging apparatuses. A second exemplary embodiment will be described below centering on color matching between a plurality of imaging apparatuses after a plurality of imaging apparatuses captures images of any one of a plurality of objects. In the present exemplary embodiment, elements identical to those in the first exemplary embodiment are assigned the same reference numerals, and redundant description thereof will be omitted.

Figure 8:
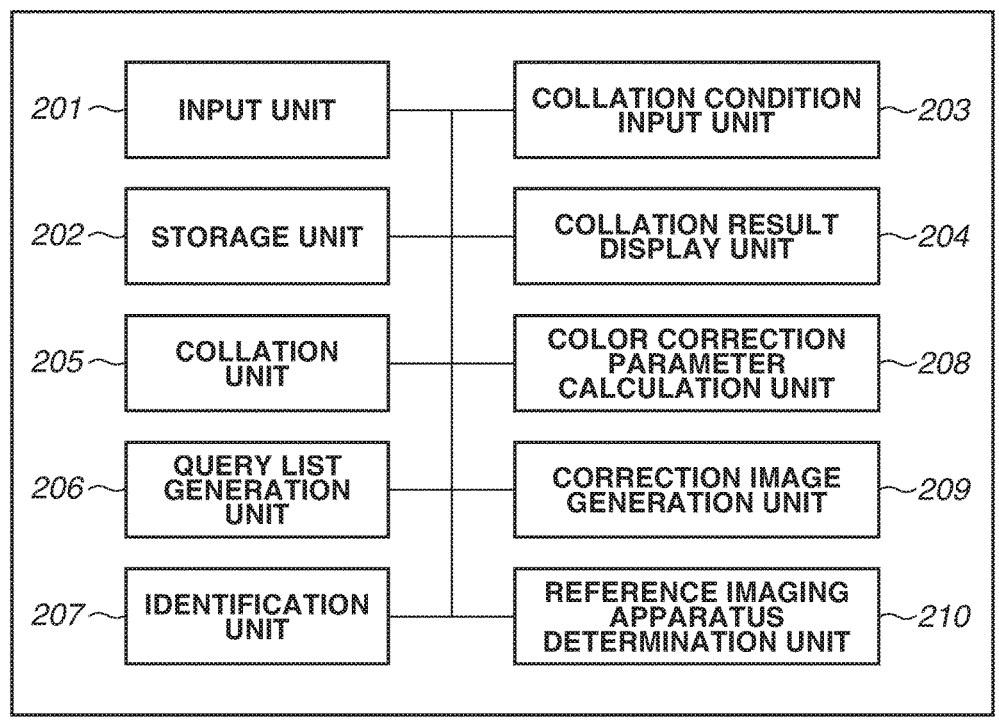
FIG. 8 is a block diagram illustrating an example of a functional configuration of an image processing apparatus according to a second exemplary embodiment.

FIG. 8 is a block diagram schematically illustrating a functional configuration of the image processing apparatus 100 according to the present exemplary embodiment. The present exemplary embodiment differs from the first exemplary embodiment in that a reference imaging apparatus determination unit 210 is included. The reference imaging apparatus determination unit 210 determines a camera (reference camera) to be used as a reference for color matching.

Color correction processing according to the present exemplary embodiment will be described in detail below. In the present exemplary embodiment, color correction parameters may be applied a plurality of times. In this case, color correction parameters may be combined into one color correction parameter in advance. For example, two look-up tables can be combined by connecting the output of one look-up table to the input of the other one. Further, color correction matrices can be combined by multiplying them in advance.

Although, in the following description, a look-up table enables obtaining the similarities between color correction parameters based on the sum of difference values when the same pixel value is given. The similarity between color correction matrices can be obtained based on difference values between elements.

However, the combination and similarity calculation of color correction parameters according to the present exemplary embodiment are not limited thereto.

The reference imaging apparatus determination unit 210 determines a reference imaging apparatus (reference camera) to be used as a reference for color matching. For example, the CPU 101 may determine a reference camera according to a specification from outside. More specifically, the CPU 101 displays a list of the network cameras 112 on the monitor 110, and sets as a reference camera a network camera 112 selected via the input device 109. For example, there is a possible case where a network camera monitoring the entrance of an institution is specified as a reference camera. Since a person captured by other cameras in the institution has passed through the entrance, the camera at the entrance is highly likely to capture the same object in common with many of other cameras. Selecting as a reference camera such a camera highly likely to capture the same object as other cameras makes it easier to obtain color correction parameters intended for color matching with the reference camera. The result is the decreased number of times of color correction applied until completion of color matching with the reference camera, reducing color correction errors.

Alternatively, if a reference camera is not specified to an input, the CPU 101 selects any one camera as a reference camera. Alternatively, the CPU 101 may determine as a reference camera a camera that captures the largest number of person images by counting the number of person images for each camera. However, a method for determining a reference camera according to the present exemplary embodiment is not limited thereto.

The color correction parameter calculation unit 208 performs control to obtain color correction parameters until the number of cameras that can be color-matched with the reference camera reaches a predetermined value.

More specifically, the CPU 101 performs control to obtain color correction parameters for performing color matching with the reference camera. Alternatively, the CPU 101 performs control to obtain color correction parameters for performing color matching with another camera that can be color-matched with the reference camera. This processing enables performing color matching with the reference camera via the another camera.

In the present exemplary embodiment, the CPU 101 obtains color correction parameters so that all of the cameras can be color-matched with the reference camera as much as possible. The processing will be described in detail in the color correction parameter calculation processing to be described below with reference to the flowchart illustrated in FIG. 9B.

In the present exemplary embodiment, the CPU 101 performs color matching with the reference camera on all of the cameras as much as possible. However, in obtaining color correction parameters via another camera, the CPU 101 may perform control not to obtain color correction parameters between cameras if the number of times of obtaining the parameters via another camera becomes equal to or greater than a predetermined value. Although this processing reduces the number of cameras that can be color-matched, it limits the accumulation of the correction amount due to the repetition of color correction, providing an effect of reducing color matching errors.

[Color Matching Processing Flow]

A color matching processing flow according to the present exemplary embodiment will be described below with reference to flowcharts illustrated in FIGS. 9A and 9B. Each flowchart is implemented when the CPU 101 of the image processing apparatus 100 executes a control program. In this processing, the CPU 101 identifies an object image for generating color correction parameters captured by a plurality of imaging apparatuses in common, and calculates color correction parameters between the cameras. Then, the CPU 101 generates correction images for object images captured by the respective imaging apparatuses, and calculates image feature amounts of the correction images for object images.

In performing the color matching processing, image feature amounts prior to color matching are assumed to have been pre-calculated based on the object images stored in the storage unit 202. In addition, this processing is given a list of cameras subjected to the color matching processing. This list also provides information about the color matching state of each camera (a reference camera, a color-matched camera, or an unprocessed camera). Generally, all of the cameras are unprocessed cameras. However, some cameras have already been color-matched. Therefore, when a new camera is added, a reference camera and color-matched cameras are included in the list. When the list includes a reference camera and color-matched cameras, the list is also additionally given color correction parameters for these cameras.

The color matching processing will be described in detail below with reference to FIG. 9A.

In step S901a, the CPU 101 generates a query list. More specifically, the query list generation unit 206 selects some object images from among the object images stored in the storage unit 202, and sets them as queries. Then, the CPU 101 sorts these queries in descending order of priority to generate a query list. For example, the CPU 101 selects a predetermined number of object images in descending order of the image capturing time, and generates a query list in descending order of the image capturing time. Alternatively, when any camera has already been color-matched, the CPU 101 may generate a query list by preferentially selecting object images captured by unprocessed cameras. Further, the CPU 101 may preferentially select objects moving toward color-matched cameras by using motion vectors of objects in unprocessed cameras.

In step S902a, the CPU 101 starts a loop for sequentially processing the queries in the query list acquired in step S901a. The queries are sequentially assigned a number from 1. To refer to the query list by using a variable i, the CPU 101 first initializes the variable i to 1. When the variable i is equal to or smaller than the number of queries, the processing proceeds to step S903a. On the other hand, when this condition is not met, the processing exits the loop and proceeds to step S907a.

In step S903a, by using as image feature amounts having a low color dependence image feature amounts that do not change so largely even when the color largely changes, the CPU 101 retrieves an object image similar to the i-th query from the storage unit 202. More specifically, the collation unit 205 assumes the comparison source object image as the i-th query and an object image stored in the storage unit 202 as the comparison target object image. Then, the collation unit 205 performs collation by using image feature amounts having a low color dependence. For example, in collation, the collation unit 205 uses the image feature amount extracted from a luminance image illustrated in FIG. 3. Finally, the collation unit 205 associates the comparison target object image with the similarity to provide a retrieval result.

In step S904a, the CPU 101 determines whether the retrieval result having a similarity equal to or greater than a predetermined value includes an object image captured by at least two cameras including an unprocessed camera. More specifically, focusing only on object images having a similarity equal to or greater than the predetermined value, the CPU 101 identifies the cameras that captured respective object images. When at least two cameras are identified and these cameras include an unprocessed camera (YES in step S904a), the processing proceeds to step S905a. On the other hand, when this condition is not satisfied (NO in step S904a), the processing proceeds to step S906a.

In step S905a, the CPU 101 determines and stores an object image for generating color correction parameters. The object selection processing in this step is performed in a similar way to the first exemplary embodiment. More specifically, as an object image suitable for color correction parameter calculation, the CPU 101 preferentially selects object images from which color information other than achromatic colors can be acquired. Then, the CPU 101 selects objects that are so unique as not to be recognized by mistake as an identical object, and have high similarities with object images captured by different imaging apparatuses. Then, the CPU 101 determines one object image having a high similarity for each camera. The CPU 101 stores these object images as object images for generating color correction parameters. Alternatively, when a plurality of object images having a similarity equal to or greater than a predetermined value exists in one camera that captured the object images, all of the object images may be used as object images for generating color correction parameters.

In step S906a (the end the loop for the query list), the CPU 101 increments the variable i by 1, and the processing returns to step S902a.

The processing in steps S902a to S906a is performed by the identification unit 207. An object image for generating color correction parameters is identified by this processing. For example, a result is summarized as a table of objects for generating color correction parameters, as illustrated in FIG. 10A. In the table illustrated in FIG. 10A, "O" indicates "a camera in which an object image for generating color correction parameters is found" for each query. More specifically, as illustrated in FIG. 10B, a person for the first query Q1 is captured by the cameras A, B, C, and D, and the captured images are stored in the storage unit 202. This means that object images similar to the first query Q1 are found. Although not illustrated in FIG. 10B, the object ID of each object image for generating color correction parameters is also stored. This object ID enables referring to object image data via the storage unit 202.

In step S907a, by using the object image for generating color correction parameters obtained in steps S902a to S906a, the CPU 101 calculates color correction parameters for each camera. The calculation processing will be described in detail below with reference to a flowchart illustrated in FIG. 9B. As a result of this calculation processing, there is acquired a color correction parameter group with which each camera performs color matching with the reference camera. A graph illustrated in FIG. 10C illustrates that each camera performs color matching with the reference camera. Each node indicates a camera, and the node drawn with double lines indicates the reference camera. Referring to FIG. 10C, for example, the camera A has been determined as a reference camera, and parameters for performing color correction with the camera A have been obtained for the cameras B, C, and D. In addition, parameters for performing color correction with the camera B have been obtained for the camera E. Likewise, parameters for performing color correction with the camera E have been obtained for the cameras F, G, and H.

In step S908a, the CPU 101 generates a correction image. More specifically, the correction image generation unit 209 generates a correction image by matching the colors of object images captured by the respective cameras with the colors of an object image captured by the reference camera. For example, a color correction parameter group as illustrated in FIG. 10C is assumed to have been acquired. In this case, the colors of an object image captured by the camera G are converted to match the colors of an image captured by the camera E, converted to match the colors of an image captured by the camera B, and eventually converted to match the colors of an image captured by the camera A. The CPU 101 repeats color correction in this way to generate correction images for images captured by the respective cameras to match with the colors of an image captured by the reference camera.

The CPU 101 stores the generated correction images in the storage unit 202 to allow them to be used in object image collation by the collation unit 205. Alternatively, the CPU 101 may pre-calculate attribute information to be used by the collation unit 205 based on the correction images. For example, the CPU 101 may recalculate the image feature amounts extracted from a color image illustrated in FIG. 3 and then store it in the storage unit 202.

[Color Correction Parameter Calculation Processing]

The color correction parameter calculation processing will be described below with reference to a flowchart illustrated in FIG. 9B. This processing is performed mainly by the color correction parameter calculation unit 208. In this processing, the CPU 101 performs processing for obtaining color correction parameters to generate correction images for matching the colors of images captured by the cameras with the colors of an image captured by the reference camera, by using object images for generating color correction parameters.

In performing this processing, a table of objects for generating color correction parameters is given. In addition, this processing is given a list of cameras subjected to the color correction processing. This processing is also given information about the color matching state of each camera (a reference camera, a color-matched camera, or an unprocessed camera). In addition, when the list includes a reference camera and color-matched cameras, the list is also additionally given color correction parameters for these cameras.

The processing will be described in detail below with reference to FIG. 9B. The following description will be made on the premise that all of the cameras are unprocessed cameras and that the table illustrated in FIG. 10A is given as a table of objects for generating color correction parameters.

In step S901b, the CPU 101 determines a reference camera. More specifically, the reference imaging apparatus determination unit 210 determines a reference camera. For example, if a reference camera is specified from input, it is used as a reference camera. If a reference camera is not specified, the CPU 101 selects any one camera as a reference camera. In this case, among the cameras A to H illustrated in FIG. 10A, the camera A is assumed to have been selected as a reference camera.

In step S902b, the color correction parameter calculation unit 208 lists unprocessed cameras. For example, the CPU 101 lists all of the cameras other than the reference camera (the cameras B to H) illustrated in FIG. 10A as unprocessed cameras.

In step S903b, the CPU 101 determines whether any one unprocessed camera captures an object image for generating color correction parameters in common with color-matched cameras. When any one unprocessed camera captures the object image for generating color correction parameters in common with color-matched cameras (YES in step S903b), the processing proceeds to step S904b. On the other hand, when this condition is not satisfied (NO in step S903b), the processing exits the flowchart. For example, referring to FIG. 10A, when focusing on an object image for generating color correction parameters similar to the first query Q1, the unprocessed cameras B, C, and D capture the object image for generating color correction parameters in common with the reference camera A. Therefore, any one unprocessed camera captures an object image for generating color correction parameters in common with color-matched cameras (YES in step S903b), and the processing proceeds to step S904b.

In step S904b, the color correction parameter calculation unit 208 selects the unprocessed camera that captures an object image for generating color correction parameters in common with color-matched cameras, and obtains color correction parameters.

In step S903b, the CPU 101 selects one of the unprocessed cameras B, C, and D. For example, the camera B is assumed to have been selected. Then, by using the image of the camera A and the image of the camera B retrieved by the first query Q1 as object images for generating color correction parameters, the color correction parameter calculation unit 208 obtains color correction parameters for matching the colors of an image of the camera B with the colors of an image of the camera A.

Then, the CPU 101 sets the camera B not to be reselected as a color-matched camera in step S903b.

By repeating the above-described processing, the CPU 101 obtains color correction parameters for matching the colors of images of the cameras B, C, and D with the colors of an image of the camera A based on the object image for generating color correction parameters retrieved by the query Q1, as illustrated in FIG. 10C. Similarly, the CPU 101 obtains color correction parameters for matching the colors of an image of the camera E with the colors of an image of the camera B based on the object image for generating color correction parameters retrieved by the query Q2. Finally, the CPU 101 obtains color correction parameters for matching the colors of images of the cameras F, G, and H with the colors of an image of the camera E based on the object image for generating color correction parameters retrieved by the query Q3. In the present exemplary embodiment, as described above, each of a plurality of objects (Q1, Q2, and Q3) is captured by at least two of a plurality of the cameras. This enables performing color matching between a plurality of imaging apparatuses.

Although, in the example illustrated in FIG. 10A, all of the cameras can be color-matched with the reference camera, if any camera does not capture an object image for generating color correction parameters in common with the reference camera and color-matched cameras, the camera will remain as an unprocessed camera.

In this case, the CPU 101 may end the processing of the flowchart illustrated in FIG. 9A without performing the processing in step S908a not to perform color matching processing. Then, the CPU 101 may perform these pieces of processing again after continuing image capturing from the cameras for a certain time period to increase the number of object images stored in the storage unit 202. Thus, the cameras will be color-matched only when all of them can be color-matched.

Alternatively, in the processing in step S908a, the CPU 101 may perform color matching only on object images captured by color-matched cameras, and not perform color matching on object images captured by unprocessed cameras. In this case, in performing collation between the comparison source and the comparison target object images input from the collation condition input unit 203, the CPU 101 may become unable to perform color matching on either one of the two images. In this case, the CPU 101 may perform collation by using color-independent feature amounts. Alternatively, the CPU 101 may perform collation by using color-dependent feature amounts, ignoring that color matching is not completed.

However, processing when an unprocessed camera remains according to the present exemplary embodiment is not limited thereto.

The above-described processing can restrict the degradation of the object image collation accuracy due to differences between image colors on different imaging apparatuses that have captured an identical object. For example, images of an identical object captured by monitoring cameras installed in different environments may possibly provide different colors because of the influences of shadows, sunlight, and light source differences. The above-described processing will restrict the degradation of the collation accuracy caused by these influences.

In addition, also when any camera does not capture an object image suitable for generating color correction parameters in common with the reference camera, the CPU 101 performs color matching with another camera and then can perform color matching with the reference camera via the another camera. For example, it is rare that an identical object is captured by all of cameras installed in a wide area such as an airport. Therefore, an object image suitable for generating color correction parameters may not possibly be acquired between cameras. In this case, it is useful to perform color matching with the reference camera via another camera.

A correction image generated by using the color correction parameters may be used not only for collation but also for display. For example, in displaying a result on the collation result display unit 204, the generated correction image may be displayed. This processing eliminates color differences between display images of an identical object, allowing a viewer to comfortably view images.

Although, in the second exemplary embodiment, images are determined as an identical object when the similarity is equal to or greater than a predetermined value as a result of collation between object images, the determination is not always correct. When color matching is performed by using an image of the body region other than the face region used for collation, the image of the body region may have been changed. For example, assume a case where an image of an identical person is captured and correctly identified by using attributes and image feature amounts of the face for collation. In this case, however, if color information of the person's body region (cloth portion) is used to calculate color correction parameters, erroneous color correction parameters may be obtained after the cloth is put on or off.

A third exemplary embodiment will be described below centering on an image processing apparatus 100 for generating a plurality of color correction parameter candidates between unprocessed cameras and color-matched cameras, and determining highly reliable color correction parameters. In the present exemplary embodiment, elements identical to those in the first and the second exemplary embodiments are assigned the same reference numerals, and redundant description thereof will be omitted.

Figure 11:
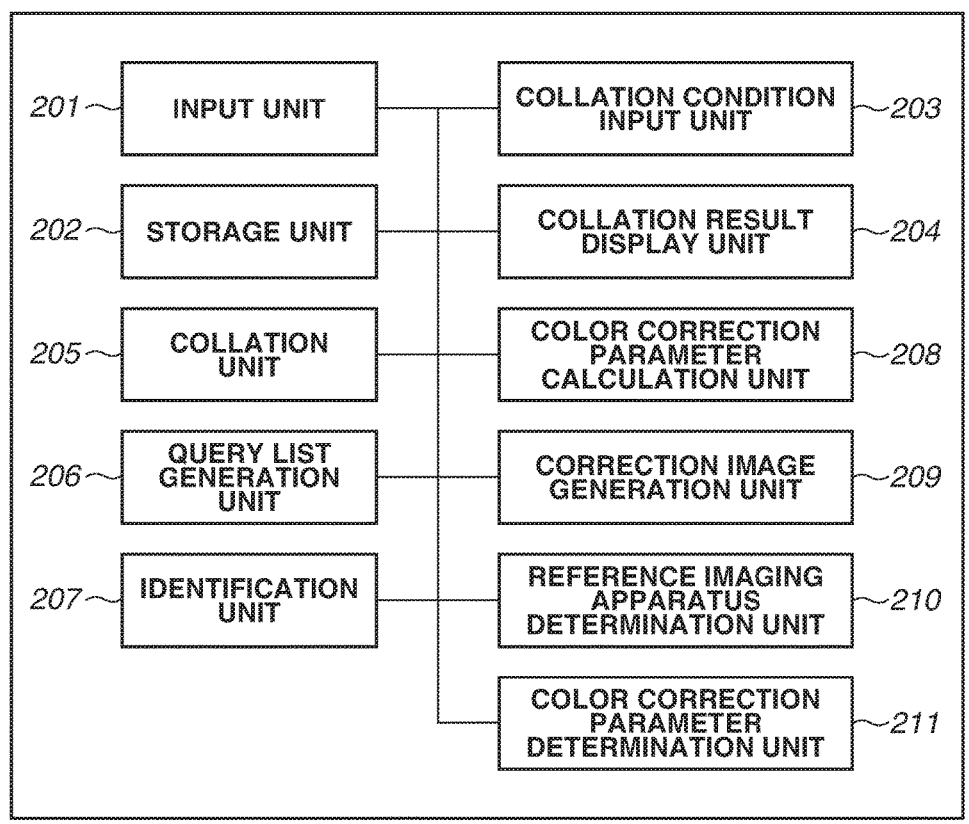
FIG. 11 is a block diagram illustrating an example of a functional configuration of an image processing apparatus according to a third exemplary embodiment.

FIG. 11 is a block diagram schematically illustrating a functional configuration of the image processing apparatus 100 according to the present exemplary embodiment. The configuration of the image processing apparatus 100 according to the present exemplary embodiment is basically the same as the configuration illustrated in FIG. 8 according to the second exemplary embodiment. However, the image processing apparatus 100 according to the present exemplary embodiment includes a color correction parameter determination unit 211 as a newly added unit.

The color correction parameter determination unit 211 determines highly reliable color correction parameters based on a plurality of color correction parameters between unprocessed cameras and color-matched cameras. More specifically, after performing color matching with the colors of an image of the reference camera, when the CPU 101 determines that the colors of a plurality of correction images for an identical camera are identical by using a plurality of color correction parameters, the CPU 101 counts the number of color correction parameters that provide the same color correction result. When the ratio of the number of the counted color correction parameters is equal to or greater than a predetermined value, the CPU 101 determines one of the counted color correction parameters.

When a plurality of identical objects is captured, the CPU 101 obtains the ratio of each color correction parameter group that provides the same color correction result for each object, identifies color correction parameter groups having the largest ratio, and determines one of the color correction parameter groups. This processing enables selecting correct color correction parameters when the number of correct color correction parameters is greater than the number of erroneous color correction parameters.

Processing of the image processing apparatus 100 according to the present exemplary embodiment will be described in detail below with reference to a flowchart illustrated in FIG. 12.

In this processing, unprocessed cameras are sequentially changed to color-matched cameras. Therefore, the number of color correction parameter candidates between unprocessed cameras and color-matched cameras has a tendency to gradually increase. Therefore, even an unprocessed camera not having a sufficient number of color correction parameters at the beginning of processing comes to be able to acquire a sufficient number of color correction parameters as the processing progresses. Therefore, specifying a condition "the number of color correction parameter candidates is equal to or greater than a predetermined value" is effective for increasing the probability for selecting correct color correction parameters.

The CPU 101 determines whether color correction parameters provide the same color correction result by obtaining a result (correction images) of performing color correction by using each color correction parameter on images captured by the same camera, and comparing the results. For example, the CPU 101 may obtain a difference image of two correction images, and determine that the two correction images are identical when the sum of difference values is equal to or smaller than a predetermined value. Alternatively, the CPU 101 may obtain color histograms of the two correction images, and determine that the colors of the two correction images are identical when the similarity between the histograms is equal to or greater than a predetermined value. A method for determining whether the colors of correction images are identical according to the present exemplary embodiment is not limited thereto.

In the present exemplary embodiment, the CPU 101 selects one of color correction parameters that provide the same color correction result to determine a highly reliable color correction parameter. However, the CPU 101 may generate an average color correction parameter based on a plurality of color correction parameters. Alternatively, the CPU 101 may calculate new color correction parameters based on a plurality of objects for generating color correction parameters that are a basis of color correction parameters.

For example, as discussed in Japanese Patent Application Laid-Open No. 2009-49759, when a look-up table is configured, corresponding points are acquired from a plurality of objects for generating color correction parameters, and color correction parameters are acquired based on these corresponding points. Alternatively, the CPU 101 may obtain an average look-up table based on a plurality of look-up tables. For example, an average look-up table is configured, in which an average value of outputs when all of input values are given to each look-up table is associated with input values.

Alternatively, as discussed in Japanese Patent No. 4715527, a plurality of colors before and after correction is acquired from a plurality of objects for generating color correction parameters, and a color correction matrix satisfying as many colors as possible is acquired through the least-square method. Alternatively, the CPU 101 may obtain an average color correction matrix by using a plurality of color correction matrices. For example, the CPU 101 may calculate an average value for each element of a matrix to acquire a color correction matrix having the average value as an element.

However, a method for determining highly reliable color correction parameters according to the present exemplary embodiment is not limited to a method for selecting one parameter. However, a method for generating a new color correction parameter based on a plurality of color correction parameters and a plurality of object images for generating color correction parameters is not limited thereto.

The reference imaging apparatus determination unit 210 determines a camera to be used as a reference for color matching (reference camera). In the present exemplary embodiment, the CPU 101 determines a reference camera based on the number of identical objects (objects for generating color correction parameters) captured by a plurality of cameras in common. More specifically, the CPU 101 counts the number of different objects captured in common between every two cameras, as objects for generating color correction parameters. This number is referred to as a number of the common object. Then, the CPU 101 determines one of the two cameras having the largest number of the common object as a reference camera.

For example, the number of common objects is counted as follows. As illustrated in FIG. 13B, each of persons (objects) of the queries Q1, Q2, and Q3 is captured by the cameras A and B, and the captured images are stored in the storage unit 202. As illustrated in the table of objects for generating color correction parameters illustrated in FIG. 13A, the number of common objects between the cameras A and B is "3" since three objects corresponding to the queries Q1, Q2, and Q3 are captured in common. Similarly, the number of common objects between the cameras B and E is "1" since one object corresponding to the query Q4 is captured in common. The CPU 101 obtains the number of common objects between every two cameras, identifies a pair of cameras that provides the largest number of the common objects, and determines one of the two cameras as a reference camera.

A larger number of color correction parameters calculated by the color correction parameter calculation unit 208 enables the color correction parameter determination unit 211 to select a larger number of correct color correction parameters. Further, a larger number of the common objects enables the color correction parameter calculation unit 208 to calculate a larger number of color correction parameters. If the reference imaging apparatus determination unit 210 selects a camera having a large number of the common objects as a reference camera, there is provided an effect that correct color correction parameters can be selected.

The number of common objects may be acquired not between two cameras but between one camera and any other cameras. For example, referring to the table of objects for generating color correction parameters illustrated in FIG. 13A, the number of common objects of the camera B is "4" since objects corresponding to the queries Q1 to Q4 are captured by any other cameras in common. Similarly, the number of common objects of the camera E is "4" since objects corresponding to the queries Q4 to Q7 are captured by any other cameras in common. In this case, since it is not necessary to obtain the number of common objects in combination with other cameras, the number of common objects can be acquired in an easier way. However, since the number of common objects is not strictly obtained, a camera having a small number of the common objects between two cameras, such as the camera E, may possibly acquire a large number of the common objects. Therefore, the number of common objects between two cameras may further be obtained only with a camera having the thus-acquired large number of the common objects. This processing eliminates the need of obtaining the number of common objects for all combinations of cameras, and the amount of calculation can be expected to reduce.

Alternatively, in the case of the same number of the common objects, when the number of common objects between two cameras is obtained, either one camera whichever has a larger number of the common objects with any other cameras may be selected. A camera having a larger number of the common objects with any other cameras indicates that a larger number of cameras can be directly color-matched with the camera. Therefore, if such a camera is selected as a reference camera, the number of application times of color correction can be expected to decrease. Accordingly, erroneous color correction can be expected to reduce.

Although it is desirable to determine a reference camera as described above, a method for determining a reference camera according to the present exemplary embodiment is not limited thereto.

Color matching processing according to the present exemplary embodiment is similar to that according to the second exemplary embodiment described with reference to the flowchart illustrated in FIG. 9A.

Color correction parameter calculation processing according to the present exemplary embodiment will be described below with reference to FIG. 12. This processing is performed mainly by the color correction parameter calculation unit 208. In this processing, the CPU 101 performs processing for obtaining color correction parameters to generate a correction image for matching the colors of images captured by the cameras with the colors of an image captured by the reference camera by using object images for generating color correction parameters.

In performing this processing, a table of objects for generating color correction parameters is given. In addition, this processing is given a list of cameras subjected to color correction. This processing is also given information about the color matching state of each camera (a reference camera, a color-matched camera, or an unprocessed camera). In addition, when the list includes a color-matched cameras with a reference camera, the list is also additionally given color correction parameters for these cameras.

The processing will be described in detail below with reference to FIG. 12. The following description will be made on the premise that all of the cameras are unprocessed cameras and that the table illustrated in FIG. 13A is given as a table of objects for generating color correction parameters.

In step S1201, the CPU 101 determines a reference camera. More specifically, the reference imaging apparatus determination unit 210 determines a reference camera. For example, if a reference camera is specified by a user, it is used as a reference camera. When a reference camera is not specified, as described in the description of the reference imaging apparatus determination unit 210, the reference imaging apparatus determination unit 210 determines a camera having the largest number of the common objects between two cameras as a reference camera. For example, referring to FIG. 13A, since the number of common objects between the cameras A and B is "3" and is the largest, the camera A, which is one of the two cameras, is assumed to have been determined as a reference camera.

In step S1202, the CPU 101 lists unprocessed cameras and obtains the number of common objects between each unprocessed camera and the color-matched camera group. Then, the CPU 101 leaves the listed unprocessed cameras unprocessed.

For example, the table illustrated in FIG. 13A lists unprocessed cameras B to H. Since color-matched cameras include only the reference camera A, the number of common objects with the camera A is acquired. More specifically, the number of common objects between the cameras B, C, and D is 3, and the number of common objects between the cameras E, F, G, and H is 0.

In step S1203, the CPU 101 determines whether an unprocessed unprocessed camera is included in the unprocessed cameras listed in step S1202. When an unprocessed camera is included in the unprocessed cameras (YES in step S1203), the processing proceeds to step S1204. On the other hand, when this condition is not satisfied (NO in step S1203), the processing exits this flowchart.

In step S1204, the CPU 101 selects an unprocessed camera having the largest number of the common objects from among the unprocessed unprocessed cameras. In the example illustrated in FIG. 13A, the cameras B, C, and D each having a number of common objects with the camera A of "3" are unprocessed cameras having the largest number of the common objects. Therefore, the CPU 101 selects one of the cameras B, C, and D. For example, the camera B is selected. The CPU 101 stores the selected camera as a color-matched camera.

In step S1205, when the color correction parameter determination unit 211 performs color matching on the selected unprocessed camera with the reference camera, it counts the number of color correction parameter candidates that provide the same color correction result.

In the example illustrated in FIG. 13A, three color correction parameters can be generated between the unprocessed camera B and the reference camera A. Then, the CPU 101 determines whether each color correction parameter provides the same color correction result. As described in the description of the color correction parameter determination unit 211, this determination method may generate and compare correction images or compare color correction parameters with each other, to perform determination. Grouping the color correction parameters determined to be identical enables grouping parameter groups providing the same color correction result.

In step S1206, the color correction parameter determination unit 211 determines whether the number of color correction parameter candidates is equal to or greater than a threshold value, and whether the ratio of the number of color correction parameters providing the same color correction result is equal to or greater than another threshold value. More specifically, the CPU 101 acquires the number of color correction parameter candidates and the ratio of the parameter candidates providing the same color correction result acquired in step S1205.

For example, there are three color correction parameters between the cameras A and B illustrated in FIG. 13A. When the number of parameters providing the same color correction result acquired in step S1205 is two, the ratio is two thirds. When the threshold value of the number of candidates is 3 or larger and the threshold value of the ratio is 60 percent or larger, the CPU 101 determines that the two color correction parameters are correct since these values satisfy the condition.

When the ratio is equal to or greater than the threshold value (YES in step S1206), the processing proceeds to step S1207. On the other hand, when this condition is not satisfied (NO in step S1206), the processing proceeds to step S1203.

In step S1207, the color correction parameter determination unit 211 determines color correction parameters to be used for correction image generation. The CPU 101 identifies color correction parameter groups having a ratio equal to or greater than the threshold value in step S1206, i.e., the color correction parameter group having the largest ratio. The CPU 101 selects and determines one of the color correction parameter groups as color correction parameters to be used for correction image generation. Alternatively, the CPU 101 may generate an average color correction parameter by using a plurality of the identified color correction parameter group.

In step S1208, the CPU 101 sets the camera selected in step S1204 as a color-matched camera. In the example illustrated in FIG. 13A, the camera B is set as a color-matched camera first.

In step S1209, the CPU 101 determines whether color matching is completed for all of the cameras. When color matching is completed for all of the cameras (YES in step S1209), the processing exits this flowchart. On the other hand, when this condition is not satisfied (NO in step S1209), the processing proceeds to step S1202.

In the example illustrated in FIG. 13A, the processing continues since the cameras C to H are unprocessed. In this state, color correction parameters for the camera B have been obtained with respect to the reference camera A. Similarly, by applying steps S1202 to S1209 to the cameras C and D having a large number of the common objects with color-matched cameras (cameras A and B), color correction parameters for the cameras C and D can be obtained. FIG. 13C illustrates a graph indicating an example of a color matching state. Referring to FIG. 13C, color correction parameters for the cameras B, C, and D have been obtained with respect to the reference camera A. By applying the processing in steps S1202 to 1209 to the camera E having a large number of the common objects with color-matched cameras (cameras A to D), color correction parameters for the camera E can be obtained. The processing will be described in detail below.

In step S1204, the CPU 101 selects the camera E as a processing target since the camera E has a number of the common objects with color-matched cameras (cameras A to D) of "3" and each of the cameras F, G, and H has a number of the common objects with color-matched cameras (cameras A to D) of "0".

In step S1205, the CPU 101 obtains a result of color correction applied to a path from the unprocessed camera E to the reference camera A. In this case, color correction parameter candidates are present for paths from the camera E to the cameras B, C, and D, as indicated by dashed lines illustrated in FIG. 13D. Therefore, the CPU 101 determines whether performing color correction on the reference camera via respective color correction parameters provides the same result. More specifically, the CPU 101 determines whether performing color correction in order of "camera E→cameras B→camera A", "camera E→camera C→camera A", and "camera E→camera D→camera A" provides the same result. The CPU 101 may generate and compare correction images in each color correction. Alternatively, when color correction parameters can be connected, the CPU 101 may directly compare connected color correction parameters.

For example, as a result of the comparison, it is assumed that color correction parameters for the cameras B and C are determined to be identical.

The CPU 101 determines that two thirds of the color correction parameters are in the equivalent level, and that the threshold value of the number of candidates (3 or larger) and the threshold value of the ratio (60 percent or larger) satisfy the condition (YES in step S1206), and the processing proceeds to step S1207.

In step S1207, color correction parameters for the camera B out of the cameras B and C are assumed to be selected. As a result, a graph indicating another example of the color matching state is as illustrated in FIG. 13E.

Since the cameras F, G, and H remain as unprocessed cameras, the CPU 101 continues this processing. However, since the cameras F, G, and H have a small number of common objects with color-matched cameras of "1" (NO in step S1206), the CPU 101 does not determine color correction parameters. As a result of this processing, therefore, a graph indicating the color matching state illustrated in FIG. 13E is obtained.

Figure 12:
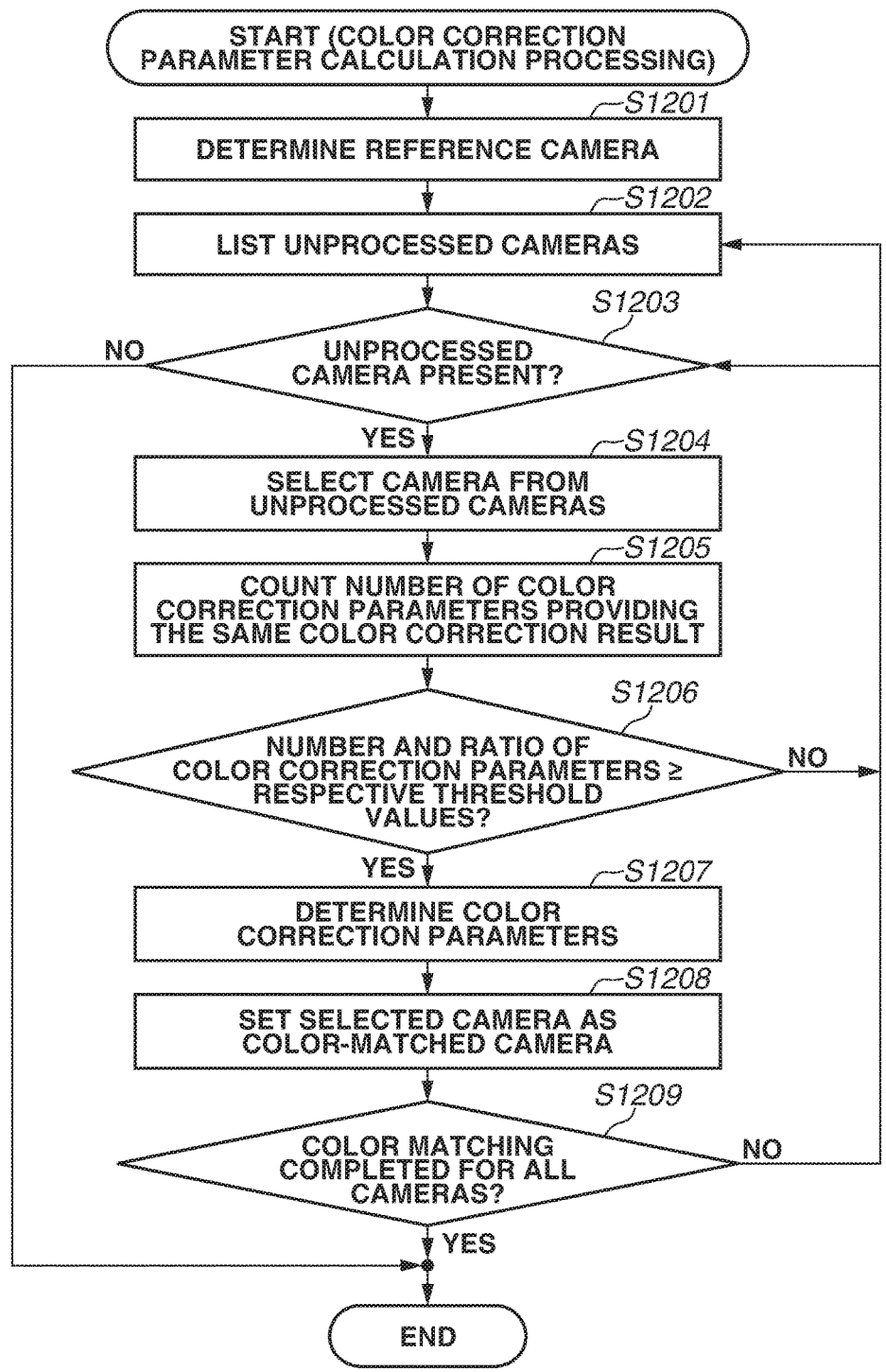
FIG. 12 is a flowchart illustrating a color matching processing flow according to the third exemplary embodiment.

An unprocessed camera may remain in the flowchart illustrated in FIG. 12. In this case, when objects for generating color correction parameters exist between unprocessed cameras and color-matched cameras, color correction parameters may be obtained by using one of the objects without taking the reliability into consideration.

Alternatively, the objects may be handled in a similar way to the second exemplary embodiment. More specifically, the CPU 101 may discard the processing results, continue the image acquisition from the cameras for a certain time period to increase the number of objects, and perform these pieces of processing again. Alternatively, the CPU 101 may perform collation in consideration of objects in a state where color correction is not possible.

However, processing in the case where an unprocessed camera remains according to the present exemplary embodiment is not limited thereto.

The above-described processing enables determining correct color correction parameters even in a case where color correction parameters are obtained by mistake from objects for generating color correction parameters.

In the third exemplary embodiment, in performing color matching with the reference camera, color correction parameters may be applied a plurality of times. In this case, since the correction amount accumulates, the color matching error may increase. A fourth exemplary embodiment of the present disclosure will be described below centering on the image processing apparatus 100 for determining a reference camera so that the error decreases by reducing the number of application times of color correction parameters. In the present exemplary embodiment, elements identical to those in the first to the third exemplary embodiments are assigned the same reference numerals, and redundant description thereof will be omitted.

The configuration of the image processing apparatus 100 according to the fourth exemplary embodiment is similar to the configuration according to the first to the third exemplary embodiments, and differs therefrom in details of processing by the reference imaging apparatus determination unit 210.

The reference imaging apparatus determination unit 210 determines a camera to be used as a reference for color matching (reference camera). In the present exemplary embodiment, the CPU 101 determines a reference camera so that the number of application times of color correction parameters is minimized. For example, "total number of times of color matching applied to a path from each camera to the reference camera" is used as the number of application times of color correction parameters. Alternatively, in consideration of the object occurrence frequency for each camera, "total of color matching occurrence frequencies, i.e., products of the occurrence frequency and the number of times of color matching" is used as the number of application times of color correction parameters. Alternatively, the CPU 101 may set a large weight to a camera of which color correction errors are to be reduced, and apply weight to the camera to obtain the number of application times of color correction parameters. However, a method for calculating the number of application times of color correction parameters according to the present exemplary embodiment is not limited thereto.

Figure 14:
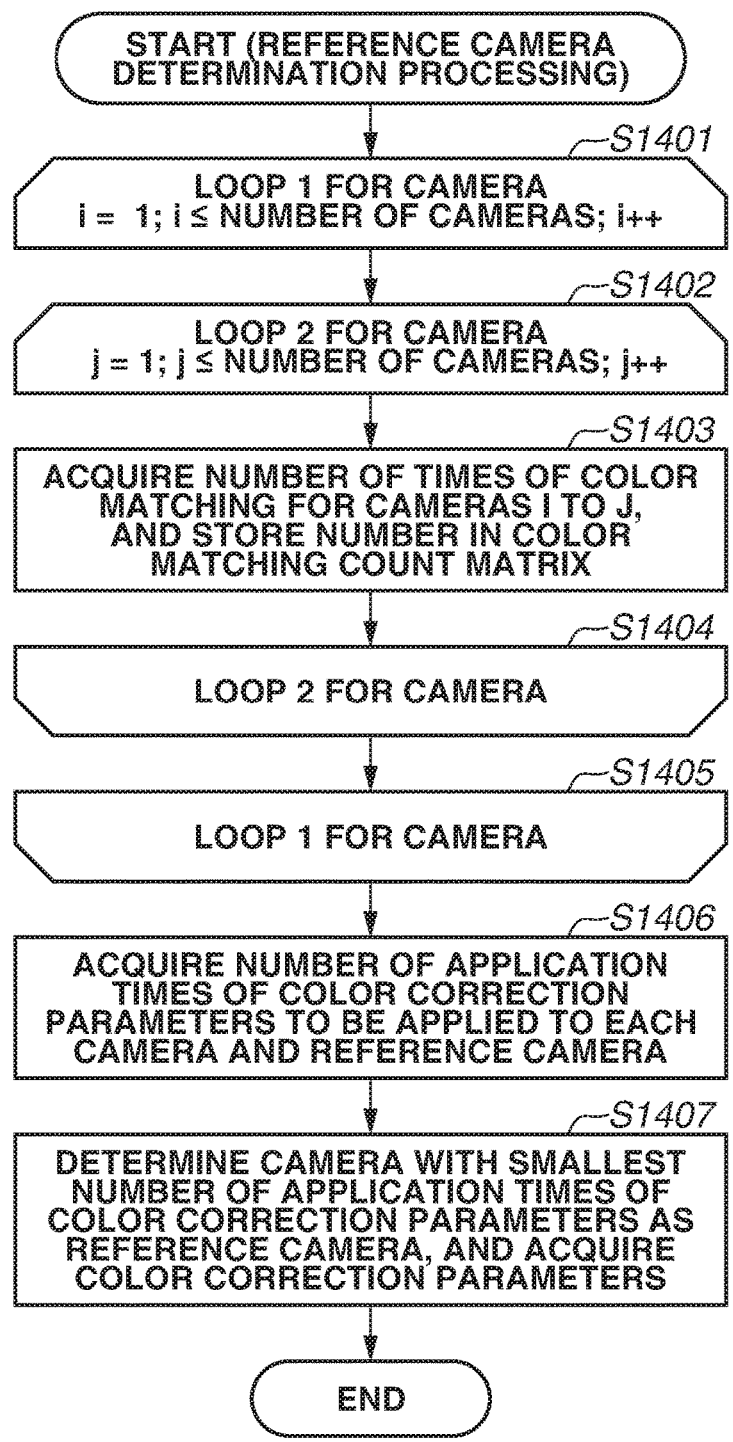
FIG. 14 is a flowchart illustrating a reference camera determination processing flow according to a fourth exemplary embodiment.

Reference camera determination processing by the image processing apparatus 100 according to the present exemplary embodiment will be described below with reference to a flowchart illustrated in FIG. 14. This processing is performed, for example, immediately after step S1407*a* (color matching processing) described above with reference to FIG. 9A.

Processing performed in steps S1401 to S1405 is processing for generating a color matching count matrix. For example, when the color matching states of the cameras are as illustrated in FIG. 15A, the number of times of color matching matrix can be obtained as illustrated in FIG. 15B. For example, since the cameras A and B are connected with one color correction parameter, the number of times of color matching is 1. Therefore, the positions corresponding to the cameras A and B are also respectively "1". Similarly, since the cameras A and E are connected with two color correction parameters, the positions corresponding to the cameras A and E are respectively "2".

In step S1406, the CPU 101 obtains the number of application times of color correction parameters to be applied to a path from each camera to the reference camera. More specifically, the CPU 101 calculates the sum for each column of the color matching count matrix. For example, referring to FIG. 15B, the total number of times of color matching is acquired for each camera as illustrated in FIG. 15C. The CPU 101 sets this number as the number of application times of color correction parameters for each camera.

Alternatively, the object occurrence frequency for each camera may be taken into consideration. For example, the CPU 101 pre-acquires the number of objects observed in unit time for each camera. For example, the CPU 101 obtains the total number of object images stored in the storage unit 202 for each camera, and calculates an average number of objects appearing per hour as the occurrence frequency. The CPU 101 may obtain the number of application times of color correction parameters by multiplying the component of each column of the color matching count matrix illustrated in FIG. 15B by the occurrence frequency acquired for each camera and calculating the sum for each column. Alternatively, the CPU 101 may obtain the number of application times of color correction parameters by multiplying the table illustrated in FIG. 15B assumed as a 1-row matrix of the occurrence frequency, from left to right.

In step S1407, assuming that a camera having the smallest number of application times of color correction parameters as a reference camera, the CPU 101 obtains color correction parameters. For example, referring to FIG. 15C, since the cameras B and E provide the smallest value, the CPU 101 selects either one of the camera B and E. In this case, the camera B is assumed to be determined as a reference camera. Then, the CPU 101 obtains color correction parameters by using the camera B as a reference camera. More specifically, the CPU 101 obtains color correction parameters so that the colors of respective imaging apparatuses are matched by using object images for generating color correction parameters used when obtaining color correction parameters. For example, color correction parameters are obtained so that the color matching state illustrated in FIG. 15D is obtained.

In the color correction parameter calculation processing, the CPU 101 determines only object images for generating color correction parameters without determining color correction parameters. Then, the CPU 101 determines a reference camera and obtains color correction parameters according to the color matching direction. Thus, the color correction parameter calculation processing can be achieved with a small amount of calculation.

A reference camera has been determined as described above so that the number of application times of color correction parameters is minimized. This enables restricting the increase in the color matching error due to the accumulation of the correction amount. If not only the number of application times of color correction parameters to a reference camera but also the object occurrence frequency in each camera is taken into consideration as the number of application times of color correction parameters, a reference camera is determined so that color matching occurrence frequency decreases. As a result, not only the accumulation of errors but also the amount of calculation can be expected to be restricted.

<Other Exemplary Embodiments>

According to the first to the fourth exemplary embodiments, a person image is used as an object. However, an object is not limited to a person. Objects include a vehicle, a poster, a signboard, a supermarket cart, a mascot character such as a costume, and so on. More specifically, when a person image is used as an object as in the above-described exemplary embodiments, an identical object (identical person) is extracted and color correction is performed by using the colors of a skin region and a cloth region. On the other hand, when an image of another thing is used as an object, color correction can be performed with sufficient accuracy even if another object of the same type is selected. For example, red vehicles of the same vehicle family generally have the same exterior color. In this case, using such color information enables performing color correction with sufficient accuracy even without using an identical object.

In using such an object other than a person, it is desirable to use feature amounts suitable for the object as feature amounts used by the object collation unit 205. For example, the SIFT feature amount may possibly be used as an image feature amount extracted from a luminance image (corresponding to the upper left in the table illustrated in FIG. 3).

Attributes extracted from a luminance image (corresponding to the upper right in the table illustrated in FIG. 3) is determined by an object used. For example, when a vehicle is used as an object, the character string of the license plate or the vehicle family may possibly be used as an attribute. Further, when a poster or a signboard is used as an object, an appearing character string may possibly be used as an attribute. In using these objects at the same time, types of the objects may possibly be used.

Depending on an object, there may be an object having a different color and the same shape. For example, a vehicle has the same vehicle family with different colors. Therefore, in using such an object, the similarity should be determined when attribute information is matched. For example, in case of a vehicle, the similarity is determined only when the number of the license plate is matched.

Further, a color histogram of an object may possibly be used as an image feature amount extracted from a color image (corresponding to the lower left in the table illustrated in FIG. 3). Alternatively, a color histogram for each region may be used. For example, in case of a vehicle, since a hood, a door, a tire, etc., can be defined as a region, a color histogram for each of these regions may possibly be acquired. Similarly, in a case of a mascot, a head and a body can be defined as a region.

In a case of a vehicle, for example, vehicle family information identifying the color may possibly be used as an attribute extracted from a color image (corresponding to the lower right in the table illustrated in FIG. 3).

However, other feature amounts may be used as feature amounts of an object. The present disclosure is not limited to these feature amounts.

The color correction parameter calculation unit 208 obtains color correction parameters so that the color appearances of objects are matched with each other. In a case of a person, a skin region and a cloth region are used. Also in a case of an object other than a person, a region to be used may be predetermined. In a case of a mascot, for example, if the type of the mascot is identified, a part having a rich color appearance may possibly be used. Alternatively, the CPU 101 may obtain color correction parameters by using all of regions.

However, the CPU 101 may calculate color correction parameters based on a method other than the above-described methods. The present disclosure is not limited to these methods for calculating color correction parameters.

By correctly identifying images of an identical object by using images of an identical object identified from objects having an attribute with a frequency equal to or smaller than a predetermined frequency, it is possible to restrict the degradation of the color matching accuracy of object images captured by a plurality of imaging apparatuses.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-118355, filed Jun. 11, 2015, and No. 2015-118356, filed Jun. 11, 2015, which are hereby incorporated by reference herein in their entirety.

What is claimed is:

1. An image processing apparatus comprising:
a detection unit configured to detect at least one identical object or at least one object of an identical type from images captured by a plurality of imaging apparatuses, wherein each imaging apparatus is a camera;
a selection unit configured to select, as an object for determining color correction information, at least one object which is captured in common by at least two imaging apparatuses included in the plurality of imaging apparatuses from among at least one detected object; and
a determination unit configured to determine the color correction information that is used for the color correction of the plurality of imaging apparatuses based on color information of the at least one selected object,
wherein the selection unit is configured to select an object having an attribute smaller than a predetermined frequency from among the at least one detected object, and
wherein each unit is implemented by one or more processors, circuitry or a combination thereof.

2. The image processing apparatus according to claim 1, wherein the selection unit selects at least one object based on a pixel-unit color histogram for each of the at least one detected object.

3. The image processing apparatus according to claim 2, wherein the selection unit selects an object of which a ratio of a number of pixels belonging to bins of a gray scale is smaller than a predetermined ratio in the color histogram.

4. The image processing apparatus according to claim 1, wherein the object is a person, and the determination unit determines the color correction information based on the color information of a face region or a body region of the person in an image of the person.

5. The image processing apparatus according to claim 1, wherein, based on a plurality of attributes of each object, the selection unit selects at least one object from among the at least one object selected based on the color information of each object.

6. The image processing apparatus according to claim 5, wherein the object is a person, and the attribute is at least one of an age, a gender, a presence/absence of glasses, a presence/absence of mustache, and a presence/absence of beard.

7. The image processing apparatus according to claim 1, wherein the determination unit determines color correction information based on color information of an object captured in common by the largest number of imaging apparatuses among the at least one selected object.

8. The image processing apparatus according to claim 1, wherein, in a case where a number of imaging apparatuses that captured at least one selected object is equal to or greater than a predetermined number, the determination unit determines color correction information based on the color information of the at least one selected object.

9. The image processing apparatus according to claim 1, wherein the selection unit selects at least one object based on a similarity of the at least one detected object.

10. The image processing apparatus according to claim 1, wherein the detection unit detects a plurality of identical objects or a plurality of objects of an identical type, and
wherein, the selection unit selects at least one object so that each of a plurality of the detected objects is captured by at least two of a plurality of the imaging apparatuses.

11. The image processing apparatus according to claim 1, wherein a plurality of the imaging apparatuses includes at least one first imaging apparatus, a plurality of second imaging apparatuses, and at least one third imaging apparatus,
wherein the selection unit selects a first object from images captured by each of the first and the second imaging apparatuses, and selects a second object from images captured by each of the second and the third imaging apparatuses, and
wherein, in a case where either the first or the second imaging apparatus is used as a reference imaging apparatus, the determination unit determines the color correction information for the first and the second imaging apparatuses based on color information of the first object, and determines the color correction information for the third imaging apparatus based on at least one of the color information of the first object and color information of the second object.

12. The image processing apparatus according to claim 11, wherein, in a case where a plurality of the second imaging apparatuses have captured the first and the second objects, and a ratio of a number of second imaging apparatuses using color correction information determined based on the first and the second objects to a number of a plurality of the imaging apparatuses is equal to or greater than a predetermined value, the determination unit determines the color correction information determined based on the first and the second objects as color correction information of a plurality of the imaging apparatuses.

13. The image processing apparatus according to claim 11, wherein, in a case where the selection unit selects the first and the second objects from an image captured by the one second imaging apparatus, the second imaging apparatus is determined as the reference imaging apparatus.

14. The image processing apparatus according to claim 11, wherein, in a case where the first object is a first person and the second object is a second person, the determination unit determines first color correction information based on the color information of a face region or a body region in an image of the first person, and determines second color correction information based on the color information of a face region or a body region in an image of the second person.

15. The image processing apparatus according to claim 11, wherein the selection unit extracts an image feature amount of the object, which is dependent on color information, from an image corrected by the color correction information determined by the determination unit, and reselects a plurality of identical objects or a plurality of objects of an identical type based on the extracted image feature amount.

16. The image processing apparatus according to claim 11, wherein the selection unit extracts an attribute of the object, which is dependent on color information, from an image corrected by the color correction information determined by the determination unit, and reselects a plurality of identical objects or a plurality of objects of an identical type based on the extracted attribute.

17. An image processing method comprising:
   detecting at least one identical object or at least one object of an identical type from images captured by a plurality of imaging apparatuses, wherein each imaging apparatus is a camera;
   selecting, as an object for determining color correction information, at least one object which is captured in common by at least two imaging apparatuses included in the plurality of imaging apparatuses from among at least one detected object; and
   determining the color correction information that is used for the color correction of the plurality of imaging apparatuses based on color information of at least one selected object,
   wherein the selecting selects an object having an attribute smaller than a predetermined frequency from among the at least one detected object.

18. A non-transitory computer readable recording medium that stores a program for causing a computer to function as the units of an image processing apparatus comprising:
   a detection unit configured to detect at least one identical object or at least one object of an identical type from images captured by a plurality of imaging apparatuses, wherein each imaging apparatus is a camera;
   a selection unit configured to select, as an object for determining color correction information, at least one object which is captured in common by at least two imaging apparatuses included in the plurality of imaging apparatuses from among at least one detected object; and
   a determination unit configured to determine the color correction information that is used for the color correction of the plurality of imaging apparatuses based on color information of at least one selected object,
   wherein the selection unit is configured to select an object having an attribute smaller than a predetermined frequency from among the at least one detected object.

19. The image processing apparatus according to claim 11, wherein a plurality of the second imaging apparatuses, which captured the first object and the second object, are provided, and
   in a case where a plurality of color correction information determined for the third imaging apparatus are provided, and color correction of the second object is performed by using the plurality of color correction information, the determination unit determines color correction information with a similar result of color correction for the second object as color correction information for the third imaging apparatus, from among the plurality of color correction information.

20. The image processing apparatus according to claim 1, wherein the plurality of imaging apparatuses includes a first imaging apparatus and a second imaging apparatus,
   wherein the selection unit selects a plurality of objects from an image captured in common by the first imaging apparatus and the second imaging apparatus, and
   wherein the determination unit determines the first imaging apparatus as a reference imaging apparatus, obtains color correction information for the second imaging apparatus, based on color information of each object, and determines, as the color correction information for the second imaging apparatus, color correction information with a ratio of similar color correction information being a threshold value or more, from among a plurality of color correction information.

* * * * *